United States Patent
Yokoyama et al.

(10) Patent No.: US 12,126,006 B2
(45) Date of Patent: Oct. 22, 2024

(54) POSITIVE ELECTRODE ACTIVE MATERIAL COMPOSITE BODY

(71) Applicant: Seiko Epson Corporation, Tokyo (JP)

(72) Inventors: Tomofumi Yokoyama, Matsumoto (JP); Hitoshi Yamamoto, Chino (JP); Tsutomu Teraoka, Matsumoto (JP); Naoyuki Toyoda, Suwa (JP)

(73) Assignee: SEIKO EPSON CORPORATION (JP)

( * ) Notice: Subject to any disclaimer, the term of this patent is extended or adjusted under 35 U.S.C. 154(b) by 1023 days.

(21) Appl. No.: 17/088,895

(22) Filed: Nov. 4, 2020

(65) Prior Publication Data

US 2021/0135191 A1    May 6, 2021

(30) Foreign Application Priority Data

Nov. 5, 2019  (JP) .................................. 2019-201088

(51) Int. Cl.
| | | |
|---|---|---|
| *H01M 4/134* | (2010.01) | |
| *H01M 4/131* | (2010.01) | |
| *H01M 4/525* | (2010.01) | |
| *H01M 10/0525* | (2010.01) | |
| *H01M 4/02* | (2006.01) | |

(52) U.S. Cl.
CPC ........... *H01M 4/134* (2013.01); *H01M 4/131* (2013.01); *H01M 4/525* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2016/0226094 A1* | 8/2016 | Yamazaki | H01M 4/1391 |
| 2016/0285080 A1* | 9/2016 | Yokoyama | H01M 4/502 |
| 2018/0301754 A1* | 10/2018 | Badding | C04B 35/481 |

FOREIGN PATENT DOCUMENTS

| | | |
|---|---|---|
| JP | 2003-059492 A | 2/2003 |
| JP | 2014-093260 A | 5/2014 |

* cited by examiner

*Primary Examiner* — Wyatt P McConnell
(74) *Attorney, Agent, or Firm* — Harness, Dickey & Pierce, P.L.C.

(57) ABSTRACT

A positive electrode active material composite body according to the present disclosure includes a positive electrode active material containing a transition metal element and having a particulate shape, and an ion conductor provided in contact with a surface of the positive electrode active material, wherein the ion conductor is constituted by a material containing Li, Zr, and M which is at least one type of element selected from the group consisting of Nb, Sb, and Ta, the transition metal element is partially diffused in the ion conductor, and an average decrease ratio of a content ratio of the transition metal element until a point where the content ratio of the transition metal element in the ion conductor to be determined by a characteristic X-ray has reached 12% of the content ratio of the transition metal element at an interface between the positive electrode active material and the ion conductor based on a substance amount is 0.5% or more and 6.1% or less per 1 nm thickness from the interface.

3 Claims, 12 Drawing Sheets

POSITIVE ELECTRODE ACTIVE MATERIAL COMPOSITE BODY

The present application is based on, and claims priority from JP Application Serial Number 2019-201088, filed on Nov. 5, 2019, the disclosure of which is hereby incorporated by reference herein in its entirety.

BACKGROUND

1. Technical Field

The present disclosure relates to a positive electrode active material composite body.

2. Related Art

A lithium-ion secondary battery has increased its importance as a high-energy power supply in a wide range of industries, and in particular, an all solid-state battery in which an electrolyte has been replaced with a solid electrolyte has attracted attention as a technique for realizing safety and rapid charging and discharging.

In an all solid-state battery, the internal resistance is likely to be high due to its material or structural characteristics, and many of them do not sufficiently operate at a temperature near room temperature, for example, at 10° C. or higher and 35° C. or lower. However, recently, charge characteristics comparable to those of a lithium-ion secondary battery in the related art even at a temperature near room temperature have been required, and a drastic decrease in charge-discharge capacity caused by the internal resistance in the operation at a temperature near room temperature has become a problem.

Therefore, an attempt to decrease an electrical resistance of a portion constituted by a material containing an active material that is a constituent member of an all solid-state battery, or a so-called internal resistance such as an ion conduction resistance of a portion constituted by a material containing a solid electrolyte has been conducted. In particular, it has been revealed that a portion of a positive electrode composite material containing a positive electrode active material and a solid electrolyte accounts for a large proportion of the internal resistance of an all solid-state battery.

However, an interface formation technique capable of decreasing a charge transfer resistance between a solid electrolyte and a positive electrode active material at a temperature near room temperature is lacking, and therefore, it was difficult to decrease the internal resistance of the positive electrode composite material, and the charge-discharge characteristics of an all solid-state battery at a temperature near room temperature did not reach the level of a lithium-ion secondary battery in the related art.

Therefore, in order to decrease the internal resistance of the positive electrode composite material without resort to the interface formation technique, a method of decreasing the resistance value by molding the positive electrode composite material thin, a method of adopting a carbon nanotube as an electric conduction assistant, a method of increasing the electron conduction property of the positive electrode active material itself by partially substituting oxygen constituting the positive electrode active material with nitrogen, and the like have been attempted.

However, in a process of charge transfer occurring when lithium ions travel between the positive electrode active material and the solid electrolyte, when the interface formation is insufficient, lithium ions are lacking in the vicinity of the interface, and the charge transfer reaction no longer proceeds, and therefore, even if the internal resistance is decreased by an electrical design method, there was a limit on the formation of an all solid-state battery that can withstand practical use.

Therefore, recently, an attempt to decrease the charge transfer resistance and also to avoid lack of ions during high-rate charging and discharging by disposing a material that affects the electrical state of an interface where charge transfer between the positive electrode active material and the solid electrolyte occurs has attracted attention.

For example, JP-A-2003-59492 (Patent Document 1) discloses a technique for coating active material particles with a layer composed of lithium ion conductive inorganic solid electrolyte particles and electric conductive agent particles that are mutually bound to each other for improving the adhesion between a solid electrolyte and an active material.

Further, in JP-A-2014-93260 (Patent Document 2), an attempt to mix a material having a low melting point such as $SiO_2$ or an amorphous material and sinter the resulting mixture at a high temperature is performed for rigidly coupling an ion conductor to a positive electrode active material.

However, according to the configuration described in Patent Document 1, an infinite number of voids are likely to be generated in the solid electrolyte, and also point contact is likely to occur at the interface, and therefore, lack of lithium ions in the vicinity of the interface easily occurs, and it was not a technique capable of realizing an all solid-state battery that sufficiently operates at a temperature near room temperature.

Further, according to the configuration described in Patent Document 2, a medium having a lithium ion concentration different from the ion conductor is mixed, and a capacitor resistance is formed at the interface between both members during charging and discharging, and therefore, there was a problem that the net internal resistance of the positive electrode composite material is increased instead.

SUMMARY

The present disclosure has been made for solving the above problems and can be realized as the following application examples.

A positive electrode active material composite body according to an application example of the present disclosure includes: a positive electrode active material containing a transition metal element and having a particulate shape; and an ion conductor provided in contact with a surface of the positive electrode active material, wherein the ion conductor is constituted by a material containing Li, Zr, and M which is at least one type of element selected from the group consisting of Nb, Sb, and Ta, the transition metal element is partially diffused in the ion conductor, and an average decrease ratio of a content ratio of the transition metal element until a point where the content ratio of the transition metal element in the ion conductor to be determined by a characteristic X-ray has reached 12% of the content ratio of the transition metal element at an interface between the positive electrode active material and the ion conductor based on a substance amount is 0.5% or more and 6.1% or less per 1 nm thickness from the interface.

In the positive electrode active material composite body according to another application example of the present disclosure, the ion conductor may be a garnet-type or garnet-like crystal that is represented by a compositional formula: $Li_{7-x}La_3(Zr_{2-x}M_x)O_{12}$, and that satisfies $0.1 \leq x \leq 1.3$.

In the positive electrode active material composite body according to another application example of the present disclosure, the transition metal element contained in the positive electrode active material may be Co.

In the positive electrode active material composite body according to another application example of the present disclosure, the positive electrode active material may be $LiCoO_2$.

DESCRIPTION OF EXEMPLARY EMBODIMENTS

Hereinafter, preferred embodiments of the present disclosure will be described in detail.

[1] Positive Electrode Active Material Composite Body

First, a positive electrode active material composite body according to the present disclosure will be described.

Figure 1:
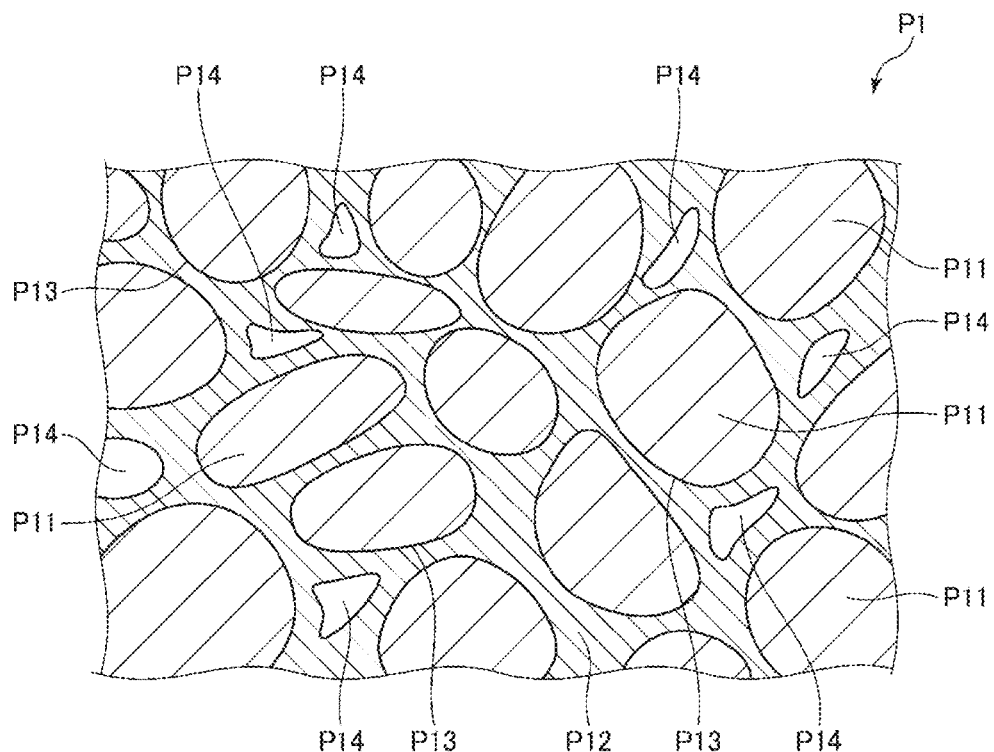
FIG. 1 is an enlarged cross-sectional view schematically showing a positive electrode active material composite body according to the present disclosure.
Figure 2:
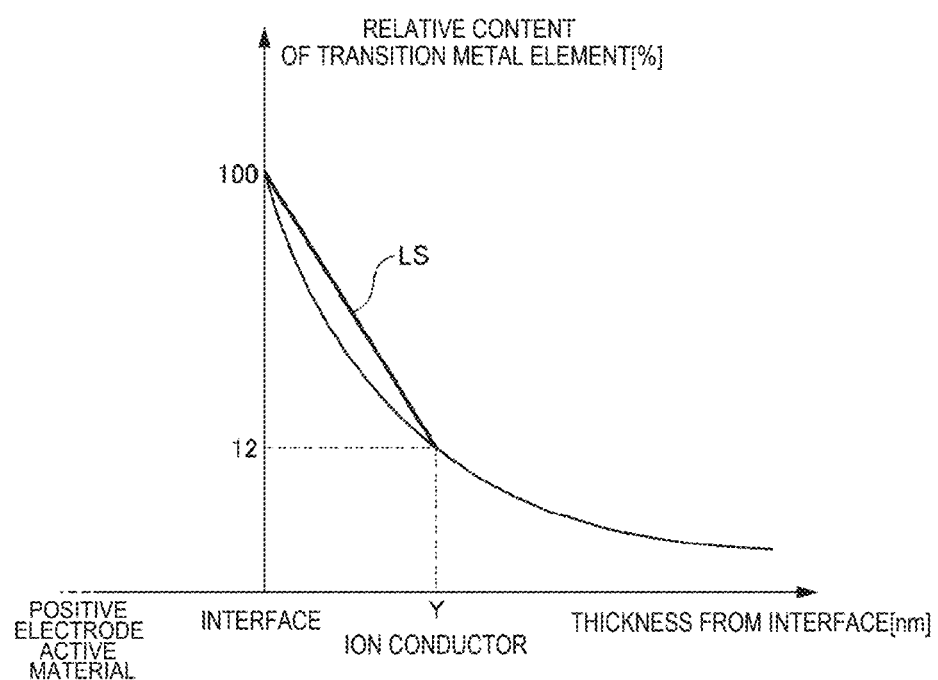
FIG. 2 is a view schematically showing a distribution of a content ratio of a transition metal element contained in a positive electrode active material in the thickness direction of an ion conductor when using an interface between the positive electrode active material and the ion conductor as a reference.

FIG. 1 is an enlarged cross-sectional view schematically showing a positive electrode active material composite body according to the present disclosure. FIG. 2 is a view schematically showing a distribution of a content ratio of a transition metal element contained in a positive electrode active material in the thickness direction of an ion conductor when using an interface between the positive electrode active material and the ion conductor as a reference. The positive electrode active material composite body according to the present disclosure is used as, for example, a positive electrode composite material in a lithium-ion secondary battery.

A lithium-ion secondary battery has increased its importance as a high-energy power supply in a wide range of industries, however, in an all solid-state battery in which an electrolyte has been replaced with a solid electrolyte, the internal resistance is likely to be high due to its material or structural characteristics, and a drastic decrease in charge-discharge capacity caused by the internal resistance has become a problem.

Therefore, for the purpose of solving the problem as described above, the present inventor conducted intensive studies while paying attention to the composition of an ion conductor that functions as a solid electrolyte and a state in the vicinity of an interface between a positive electrode active material and the ion conductor. As a result, the present disclosure was completed.

That is, a positive electrode active material composite body P1 according to the present disclosure includes a positive electrode active material P11 containing a transition metal element and having a particulate shape and an ion conductor P12 provided in contact with a surface of the positive electrode active material P11. The ion conductor P12 is constituted by a material containing Li, Zr, and M which is at least one type of element selected from the group consisting of Nb, Sb, and Ta. The transition metal element contained in the positive electrode active material P11 partially transfers into the ion conductor P12 in a production process for the positive electrode active material composite body P1 and is in a diffused state. As shown in FIG. 2, a content ratio of the transition metal element in the ion conductor P12 to be determined by a characteristic X-ray decreases as distance from the positive electrode active material P11 in the thickness of the ion conductor P12, that is, along the normal direction of an interface P13 between the positive electrode active material P11 and the ion conductor P12. Then, an average decrease ratio of the content ratio of the transition metal element until a point where the content ratio of the transition metal element in the ion conductor P12 has reached 12% of the content ratio of the transition metal element at the interface P13 between the positive electrode active material P11 and the ion conductor P12 based on a substance amount is 0.5% or more and 6.1% or less per 1 nm thickness from the interface P13.

In other words, as shown in FIG. 2, when the interface P13 between the positive electrode active material P11 and the ion conductor P12 is used as a reference point of the content ratio of the transition metal element and the content ratio of the transition metal element at the interface P13 is assumed to be 100%, the content ratio of the transition metal element in the ion conductor P12 decreases as distance from the interface P13. However, when a point where this content ratio reaches 12% is assumed to be a point at a distance of Y [nm] from the interface P13, the value of (100-12)/Y satisfies a condition of 0.5 [%/nm] or more and 6.1 [%/nm] or less. In other words, the absolute value of the inclination of a line segment LS in FIG. 2 is 0.5 [%/nm] or more and 6.1 [%/nm] or less.

According to this, the positive electrode active material composite body that can be favorably used for the production of a lithium-ion secondary battery having a small internal resistance, particularly having a small internal resistance in the positive electrode composite material, and having excellent charge-discharge characteristics can be provided. More specifically, the diffusion rate of lithium ions in the positive electrode active material composite body P1 is improved, and the charge-discharge performance, particularly the charge-discharge performance at a high load can be made excellent.

On the other hand, when the conditions as described above are not satisfied, satisfactory results are not obtained.

For example, when the ion conductor P12 coming in contact with the positive electrode active material P11 does not contain at least one type of element selected from the group consisting of Nb, Sb, and Ta, a problem that the interfacial contact property is deteriorated and the charge-discharge characteristics are lowered occurs.

Further, when the ion conductor P12 coming in contact with the positive electrode active material P11 does not contain Zr, the average decrease ratio of the content ratio of the transition metal element at the interface is much larger than 6.1% per 1 nm thickness from the interface P13, and a problem that the charge-discharge characteristics are deteriorated occurs.

Further, when the ion conductor P12 coming in contact with the positive electrode active material P11 does not contain Li, the ion conduction at the interface is inhibited, and a problem that the charge-discharge rate performance is deteriorated occurs.

Further, when the average decrease ratio of the content ratio of the transition metal element per 1 nm thickness of the ion conductor P12 from the interface P13 is less than the above lower limit, lattice vibration of a multiple oxide constituting a lithium ion conduction pathway in the positive electrode active material composite body P1 is inhibited, and therefore, the charge-discharge rate performance is deteriorated instead.

Further, when the average decrease ratio of the content ratio of the transition metal element per 1 nm thickness of the ion conductor P12 from the interface P13 exceeds the above upper limit, adhesion at the interface between the positive electrode active material and the multiple oxide is lowered, and the effect of improving the charge-discharge characteristics is not obtained.

In the present disclosure, the reason why the range for determining the average decrease ratio of the content ratio of the transition metal element in the ion conductor P12 is set to be from the interface P13 between the positive electrode active material P11 and the ion conductor P12 to the point where the content ratio of the transition metal element has reached 12% of the content ratio of the transition metal element at the interface P13 is because the adhesion at the interface is increased by moderately diffusing the transition metal element, and a charge exchange reaction at the interface is most promoted.

Further, in the present disclosure, a point where the content ratio of a constituent component of the ion conductor P12, for example, Zr has reached 0% may be defined as the interface P13.

As described above, the average decrease ratio of the content ratio of the transition metal element per 1 nm thickness of the ion conductor P12 from the interface P13 need only be 0.5% or more and 6.1% or less, but is preferably 0.88% or more and 2.2% or less.

According to this, the effect of the present disclosure described above is more remarkably exhibited.

The content ratio of Co that is the transition metal element contained in the positive electrode active material P11 to be determined by a characteristic X-ray can be determined by, for example, measurement using a characteristic X-ray.

Hereinafter, the positive electrode active material composite body P1 including the positive electrode active material P11 and the ion conductor P12 will be described in detail.

[1-1] Positive Electrode Active Material

The positive electrode active material P11 constituting the positive electrode active material composite body P1 is a positive electrode active material that can repeat electrochemical occlusion and release of lithium ions, more specifically, is a material containing a transition metal element and having a particulate shape.

The positive electrode active material P11 is generally a lithium composite oxide as a composite oxide of Li and a transition metal element.

The transition metal element constituting the positive electrode active material P11 may be any as long as it is an element present between the group 3 element and the group 11 element in the periodic table, but is preferably at least one type selected from the group consisting of V, Cr, Mn, Fe, Co, Ni, and Cu, and is more preferably Co.

According to this, an effect that a positive electrode active material composite body capable of forming a battery having a high energy density, and also having enhanced interface adhesion and excellent output performance can be formed is obtained.

Examples of the positive electrode active material P11 include $LiCoO_2$, $LiNiO_2$, $LiMn_2O_4$, $Li_2Mn_2O_3$, $LiCr_{0.5}Mn_{0.5}O_2$, $LiFePO_4$, $Li_2FeP_2O_7$, $LiMnPO_4$, $LiFeBO_3$, $Li_3V_2(PO_4)_3$, $Li_2CuO_2$, $Li_2FeSiO_4$, and $Li_2MnSiO_4$, and one type or a combination of two or more types selected from these can be used. Further, as the positive electrode active material P11, for example, a fluoride such as $LiFeF_3$ may be used.

Among these, the positive electrode active material P11 is preferably $LiCoO_2$.

According to this, the internal resistance of the positive electrode active material composite body P1 can be further decreased, and the charge-discharge characteristics of a lithium-ion secondary battery to which the positive electrode active material composite body P1 is applied can be made particularly excellent.

The positive electrode active material P11 may contain another component in addition to the lithium composite oxide. Examples of such a component include boride complex compounds such as $LiBH_4$ and $Li_4BN_3H_{10}$, iodine complex compounds such as a polyvinylpyridine-iodine complex, and nonmetallic compounds such as sulfur.

However, the content ratio of the component other than the lithium composite oxide in the positive electrode active material P11 is preferably 3.0 mass % or less, more preferably 1.0 mass % or less, further more preferably 0.3 mass % or less.

The average particle diameter of the positive electrode active material P11 is not particularly limited, but is preferably 1.0 μm or more and 30 μm or less, more preferably 2.0 μm or more and 25 μm or less, further more preferably 3.0 μm or more and 20 μm or less.

According to this, the internal resistance of the positive electrode active material composite body P1 can be further decreased, and the charge-discharge characteristics of a lithium-ion secondary battery to which the positive electrode active material composite body P1 is applied can be made particularly excellent. Further, this is advantageous also from the viewpoint of improvement of the productivity of the positive electrode active material composite body P1 and reduction of the production cost. In addition, in a lithium-ion secondary battery to which the positive electrode active material composite body P1 is applied, an actual capacity density close to the theoretical capacity of the positive electrode active material P11 and a high charge-discharge rate are easily achieved at the same time.

Note that in the present specification, the average particle diameter refers to a volume-based average particle diameter, and can be determined by, for example, subjecting a dispersion liquid prepared by adding a sample to methanol and dispersing the sample for 3 minutes using an ultrasonic disperser to measurement with a particle size distribution analyzer according to the Coulter counter method (model: TA-II, manufactured by Coulter Electronics, Inc.) using an aperture of 50 μm.

The particle size distribution of the positive electrode active material P11 is not particularly limited, and for example, in the particle size distribution having one peak, the half width of the peak can be set to 0.15 μm or more and 19 μm or less. Further, the particle size distribution of the positive electrode active material P11 may have two or more peaks.

A specific shape of the positive electrode active material P11 is not particularly limited as long as it has a particulate shape, and may be, for example, a spherical shape, a columnar shape, a plate shape, a scaly shape, a hollow shape, an indefinite shape, or the like.

The proportion of the positive electrode active material P11 in the positive electrode active material composite body P1 is preferably 5 vol % or more and 98 vol % or less, more preferably 35 vol % or more and 90 vol % or less, further more preferably 40 vol % or more and 80 vol % or less.

According to this, the charge-discharge performance at a high load of a lithium-ion secondary battery to which the positive electrode active material composite body P1 is applied can be made more excellent.

[1-2] Ion Conductor

The ion conductor P12 is constituted by a material having an ion conduction property, and is provided in contact with a surface of the positive electrode active material P11 in the positive electrode active material composite body P1.

The ion conductor P12 is constituted by a material containing Li, Zr, and M which is at least one type of element selected from the group consisting of Nb, Sb, and Ta.

In particular, the ion conductor P12 is preferably a garnet-type or garnet-like crystal that is represented by a compositional formula: $Li_{7-x}La_3(Zr_{2-x}M_x)O_{12}$, and that satisfies a relationship: $0.1 \leq x \leq 1.3$.

According to this, an effect of decreasing lithium ion conduction resistance passing through the inside of the solid electrolyte while enhancing the adhesion between the positive electrode active material and the solid electrolyte is obtained, and therefore, the internal resistance is further decreased, and the battery characteristics at room temperature can be enhanced.

As described above, it is preferred to satisfy the relationship: $0.1 \leq x \leq 1.3$, but it is more preferred to satisfy a relationship: $0.15 \leq x \leq 1.0$, and it is further more preferred to satisfy a relationship: $0.2 \leq x \leq 0.7$.

According to this, the above-mentioned effect is more remarkably exhibited.

Further, when M is two or more types of metal elements selected from Ta, Sb, and Nb, the charge-discharge performance at a high load of a lithium-ion secondary battery to which the positive electrode active material composite body P1 is applied can be made more excellent.

When M contains two or more types of metal elements selected from Ta, Sb, and Nb, a preferred combination is a combination of Ta and Sb.

According to this, the charge-discharge performance at a high load of a lithium-ion secondary battery to which the positive electrode active material composite body P1 is applied can be made particularly excellent.

The ion conductor P12 may contain a component other than the garnet-type or garnet-like crystal represented by the compositional formula: $Li_{7-x}La_3(Zr_{2-x}M_x)O_{12}$. As such a component, for example, a solid electrolyte-metal compound having another crystal phase, or the like is exemplified.

However, the content ratio of the component other than the garnet-type or garnet-like crystal represented by the compositional formula: $Li_{7-x}La_3(Zr_{2-x}M_x)O_{12}$ in the ion conductor P12 is preferably 3.0 mass % or less, more preferably 1.0 mass % or less, further more preferably 0.3 mass % or less.

The proportion of the ion conductor P12 in the positive electrode active material composite body P1 is preferably 5 vol % or more and 90 vol % or less, more preferably 15 vol % or more and 70 vol % or less, further more preferably 30 vol % or more and 50 vol % or less.

According to this, the charge-discharge performance at a high load of a lithium-ion secondary battery to which the positive electrode active material composite body P1 is applied can be made more excellent.

When the proportion of the positive electrode active material P11 in the positive electrode active material composite body P1 is represented by X1 [vol %] and the proportion of the ion conductor P12 in the positive electrode active material composite body P1 is represented by X2 [vol %], it is preferred to satisfy a relationship: $0.1 \leq X1/X2 \leq 5.0$, it is more preferred to satisfy a relationship: $0.2 \leq X1/X2 \leq 3.5$, and it is further more preferred to satisfy a relationship: $0.5 \leq X1/X2 \leq 1.2$.

According to this, the charge-discharge performance at a high load of a lithium-ion secondary battery to which the positive electrode active material composite body P1 is applied can be made more excellent.

Further, the filling ratio of the ion conductor P12 in a region other than a region in which the positive electrode active material P11 is filled in the positive electrode active material composite body P1 is preferably sufficiently high. In other words, the proportion of a void portion P14 is preferably low.

More specifically, the filling ratio of the ion conductor P12 in a region other than a region in which the positive electrode active material P11 is filled in the positive electrode active material composite body P1 is preferably 50 vol % or more, more preferably 60 vol % or more, further more preferably 70 vol % or more and 100 vol % or less.

According to this, the charge-discharge performance at a high load of a lithium-ion secondary battery to which the positive electrode active material composite body P1 is applied can be made more excellent.

In the positive electrode active material composite body P1, it is preferred that the ion conductor P12 penetrates also in a region having a relatively large aspect ratio, for example, a region having an aspect ratio of 2 or more in the region other than the region in which the positive electrode active material P11 is filled in the positive electrode active material composite body P1.

According to this, the charge-discharge performance at a high load of a lithium-ion secondary battery to which the positive electrode active material composite body P1 is applied can be made more excellent.

Such a positive electrode active material composite body P1 can be favorably produced by a method as described in detail later.

[1-3] Other Portions

The positive electrode active material composite body P1 may include a portion other than the positive electrode active material P11 and the ion conductor P12 described above. As such a portion, for example, the void portion P14 is exemplified.

The proportion of the void portion P14 in the positive electrode active material composite body P1 is preferably 40 vol % or less, more preferably 30 vol % or less, further more preferably 20 vol % or less.

According to this, the charge-discharge performance at a high load of a lithium-ion secondary battery to which the positive electrode active material composite body P1 is applied can be made more excellent.

Further, the positive electrode active material composite body P1 may include, for example, an electric conduction assistant, a binder, or the like other than the positive electrode active material P11 and the ion conductor P12.

As the electric conduction assistant, any material may be used as long as it is an electric conductor whose electrochemical interaction can be ignored at a positive electrode reaction potential, and more specifically, for example, a carbon material such as acetylene black, Ketjen black, or a carbon nanotube, a noble metal such as palladium or platinum, an electric conductive oxide such as $SnO_2$, ZnO, $RuO_2$, $ReO_3$, or $Ir_2O_3$, or the like can be used.

[2] Production Method for Positive Electrode Active Material Composite Body

Next, a production method for the positive electrode active material composite body according to the present disclosure described above will be described.

[2-1] Production Method for Positive Electrode Active Material Composite Body of First Embodiment First, a production method of a first embodiment will be described.

In the production method for the positive electrode active material composite body P1 of this embodiment, the positive electrode active material composite body P1 is produced using a mixture of the positive electrode active material P11 and a solid composition containing a multiple oxide constituted by a crystal phase different from the crystal phase of the ion conductor P12 at normal temperature and normal pressure, a lithium compound, and an oxoacid compound.

More specifically, the production method of this embodiment includes a mixture preparation step of preparing a mixture containing the positive electrode active material P11 and the solid composition, a molding step of molding the mixture into a predetermined shape, thereby obtaining a molded body, and a heat treatment step of performing a heat treatment for the molded body, thereby obtaining the positive electrode active material composite body P1.

[2-1-1] Mixture Preparation Step

In the mixture preparation step, a mixture is obtained by mixing the positive electrode active material P11 and a solid composition containing a multiple oxide constituted by a crystal phase different from the crystal phase of the ion conductor P12 at normal temperature and normal pressure, a lithium compound, and an oxoacid compound.

[2-1-1-1] Positive Electrode Active Material

The positive electrode active material P11 to be used in the mixture preparation step is preferably a material that satisfies the same conditions as described in the above [1-1].

[2-1-1-2] Solid Composition

The solid composition to be used in the mixture preparation step contains a multiple oxide constituted by a crystal phase different from the crystal phase of the ion conductor P12 at normal temperature and normal pressure, a lithium compound, and an oxoacid compound.

In this manner, the solid composition contains a multiple oxide constituted by a crystal phase different from the crystal phase of the ion conductor P12 at normal temperature and normal pressure, a lithium compound, and an oxoacid compound. On the other hand, as described later, the oxoacid compound may be a compound containing a lithium ion together with an oxoanion. In that case, it can be said that the compound is an oxoacid compound and also is a lithium compound. Therefore, for example, even if the solid composition is composed only of a multiple oxide constituted by a crystal phase different from the crystal phase of the ion conductor P12 at normal temperature and normal pressure and a compound containing a lithium ion together with an oxoanion, it shall be treated as follows: "the solid composition is constituted by a material containing a multiple oxide constituted by a crystal phase different from the crystal phase of the ion conductor, a lithium compound, and an oxoacid compound".

The solid composition contributes to the formation of the ion conductor P12. In other words, the solid composition is a precursor of the ion conductor P12.

By using such a solid composition, by a heat treatment at a relatively low temperature and for a relatively short time, the positive electrode active material composite body P1 in which the average decrease ratio of the content ratio of the transition metal element per 1 nm thickness of the ion conductor P12 from the interface P13 falls within the predetermined numerical value range can be favorably formed. More specifically, by incorporating the oxoacid compound in the solid composition, the melting point of the multiple oxide is lowered, and the ion conductor P12 having excellent adhesion to the positive electrode active material P11 can be formed while promoting the crystal growth by a firing treatment that is the heat treatment at a relatively low temperature for a relatively short time. Further, due to an action capable of causing a reaction in which a lithium ion is incorporated into the multiple oxide contained in the solid composition during the reaction, the ion conductor P12 as the solid electrolyte that is a lithium-containing multiple oxide can be formed at a low temperature. Then, in the heat treatment step, the transition metal element can be favorably diffused in the ion conductor P12 to be formed from the positive electrode active material P11, and thus, the average decrease ratio of the content ratio of the transition metal element per 1 nm thickness of the ion conductor P12 from the interface P13 can be more favorably controlled.

Further, even when a gap between the positive electrode active materials P11 is relatively narrow or it is a gap having a high aspect ratio as described above, the ion conductor P12 can be favorably formed in the gap, and the positive electrode active material composite body P1 in which the adhesion degree between the positive electrode active material P11 and the ion conductor P12 is high and the proportion of the void portion P14 is small can be favorably produced.

From the above, for example, an all solid-state battery having excellent battery capacity at a high load can be favorably produced while suppressing the decrease in ion conductivity due to volatilization of lithium ions, which is a problem of the method of the related art.

Note that in the present specification, the normal temperature and normal pressure refers to 25° C. and 1 atm.

[2-1-1-2-1] Multiple Oxide

The solid composition contains a multiple oxide constituted by a crystal phase different from the crystal phase of the ion conductor P12 at normal temperature and normal pressure. Hereinafter, the multiple oxide is also referred to as "precursor oxide". Further, in the present specification, the "different" in terms of crystal phase is a broad concept not only including that the type of crystal phase is not the same, but also including that even if the type is the same, at least one lattice constant is different, or the like.

The precursor oxide need only have a crystal phase different from the crystal phase of the ion conductor P12 to be formed using the solid composition, however, for example, when the crystal phase of the ion conductor P12 is a cubic garnet-type crystal, the crystal phase of the precursor oxide is preferably a pyrochlore-type crystal.

According to this, even if the heat treatment for the solid composition is performed at a lower temperature for a shorter time, the ion conductor P12 having a particularly excellent ion conduction property can be favorably formed.

The crystal phase of the precursor oxide may be a crystal phase other than the pyrochlore-type crystal, for example, a cubic crystal such as a perovskite structure, a rock salt-type structure, a diamond structure, a fluorite-type structure, or a spinel-type structure, an orthorhombic crystal such as a ramsdellite type, a trigonal crystal such as a corundum type, or the like.

The composition of the precursor oxide is not particularly limited, however, the precursor oxide is preferably a multiple oxide containing La, Zr, and M when M is at least one type of element selected from the group consisting of Nb, Ta, and Sb.

According to this, even if the heat treatment for the solid composition is performed at a lower temperature for a shorter time, the ion conductor P12 having a particularly excellent ion conduction property can be favorably formed. Further, adhesion between the positive electrode active materials P11 and the ion conductor P12 in the positive electrode active material composite body P1 can be made more excellent.

The crystal grain diameter of the precursor oxide is not particularly limited, but is preferably 10 nm or more and 200 nm or less, more preferably 15 nm or more and 180 nm or less, further more preferably 20 nm or more and 160 nm or less.

According to this, due to a so-called Gibbs-Thomson effect that is a phenomenon of lowering the melting point with an increase in surface energy, the melting temperature of the precursor oxide or the firing temperature of the solid composition can be further lowered. In addition, the adhesion between the positive electrode active material P11 and the ion conductor P12 in the positive electrode active material composite body P1 can be made more excellent.

The precursor oxide is preferably constituted by a substantially single crystal phase.

According to this, the precursor oxide undergoes crystal phase transition substantially once when producing the positive electrode active material composite body P1, that is, when generating a high-temperature crystal phase, and therefore, segregation of elements accompanying the crystal phase transition or generation of a contaminant crystal by thermal decomposition is suppressed, so that various characteristics of the positive electrode active material composite body P1 to be produced are further improved.

In a case where only one exothermic peak is observed within a range of 300° C. or higher and 1,000° C. or lower when measurement is performed by TG-DTA at a temperature raising rate of 10° C./min for the solid composition, it can be determined that "it is constituted by a substantially single crystal phase".

The content ratio of the precursor oxide in the solid composition is not particularly limited, but is preferably 35 mass % or more and 75 mass % or less, more preferably 45 mass % or more and 65 mass % or less, further more preferably 55 mass % or more and 60 mass % or less.

According to this, even if the heat treatment for the solid composition is performed at a lower temperature for a shorter time, the ion conductor P12 having a particularly excellent ion conduction property can be favorably formed.

The solid composition may contain multiple types of precursor oxides. When the solid composition contains multiple types of precursor oxides, as the value of the content ratio of the precursor oxide in the solid composition, the sum of the content ratios of the precursor oxides shall be adopted.

[2-1-1-2-2] Lithium Compound

The solid composition contains a lithium compound.

Examples of the lithium compound contained in the solid composition include inorganic salts such as LiH, LiF, LiCl, LiBr, LiI, LiClO, LiClO$_4$, LiNO$_3$, LiNO$_2$, Li$_3$N, LiN$_3$, LiNH$_2$, Li$_2$SO$_4$, Li$_2$S, LiOH, and Li$_2$CO$_3$, carboxylates such as lithium formate, lithium acetate, lithium propionate, lithium 2-ethylhexanoate, and lithium stearate, hydroxy acid salts such as lithium lactate, lithium malate, and lithium citrate, dicarboxylates such as lithium oxalate, lithium malonate, and lithium maleate, alkoxides such as lithium methoxide, lithium ethoxide, and lithium isopropoxide, alkylated lithium such as methyl lithium and n-butyl lithium, sulfate esters such as lithium n-butyl sulfate, lithium n-hexyl sulfate, and lithium dodecyl sulfate, diketone complexes such as lithium 2,4-pentanedionate, and hydrates thereof, and derivatives thereof such as a halogen-substituted substance, and one type or a combination of two or more types selected from these can be used.

Among these, as the lithium compound, one type or two types selected from the group consisting of Li$_2$CO$_3$ and LiNO$_3$ is preferred.

According to this, the above-mentioned effect is more remarkably exhibited.

The content ratio of the lithium compound in the solid composition is not particularly limited, but is preferably 10 mass % or more and 20 mass % or less, more preferably 12 mass % or more and 18 mass % or less, further more preferably 15 mass % or more and 17 mass % or less.

According to this, even if the heat treatment for the solid composition is performed at a lower temperature for a shorter time, the ion conductor P12 having a particularly excellent ion conduction property can be favorably formed.

When the content ratio of the precursor oxide in the solid composition is represented by XP [mass %] and the content ratio of the lithium compound in the solid composition is represented by XL [mass %], it is preferred to satisfy a relationship: $0.13 \leq XL/XP \leq 0.58$, it is more preferred to satisfy a relationship: $0.18 \leq XL/XP \leq 0.4$, and it is further more preferred to satisfy a relationship: $0.25 \leq XL/XP \leq 0.3$.

According to this, even if the heat treatment for the solid composition is performed at a lower temperature for a shorter time, the ion conductor P12 having a particularly excellent ion conduction property can be favorably formed.

The solid composition may contain multiple types of lithium compounds. When the solid composition contains multiple types of lithium compounds, as the value of the content ratio of the lithium compound in the solid composition, the sum of the content ratios of the lithium compounds shall be adopted.

[2-1-1-2-3] Oxoacid Compound

The solid composition contains an oxoacid compound containing no metal elements.

The oxoacid compound is a compound containing an oxoanion.

Examples of the oxoanion constituting the oxoacid compound include a halogen oxoacid, a borate ion, a carbonate ion, an orthocarbonate ion, a carboxylate ion, a silicate ion, a nitrite ion, a nitrate ion, a phosphorous ion, a phosphate ion, an arsenate ion, a sulfite ion, a sulfate ion, a sulfonate ion, and a sulfinate ion. Examples of the halogen oxoacid include a hypochlorous ion, a chlorite ion, a chlorate ion, a perchlorate ion, a hypobromite ion, a bromite ion, a bromate ion, a perbromate ion, a hypoiodite ion, an iodite ion, an iodate ion, and a periodate ion.

In particular, the oxoacid compound preferably contains, as the oxoanion, at least one of a nitrate ion and a sulfate ion, and more preferably contains a nitrate ion.

According to this, the melting point of the precursor oxide is more favorably lowered, and the crystal growth of the lithium-containing multiple oxide can be more effectively promoted. As a result, even if the heat treatment for the solid composition is performed at a lower temperature for a shorter time, the ion conductor P12 having a particularly excellent ion conduction property can be favorably formed.

A cation constituting the oxoacid compound is not particularly limited, and examples thereof include a hydrogen ion, an ammonium ion, a lithium ion, a lanthanum ion, a zirconium ion, a niobium ion, a tantalum ion, and an antimony ion, and one type or a combination of two or more types selected from these can be used, however, it is preferably an ion of a constituent metal element of the ion conductor P12 to be formed using the solid composition.

According to this, an undesirable impurity can be more effectively prevented from remaining in the solid electrolyte to be formed.

When the oxoacid compound is a compound containing a lithium ion together with an oxoanion, it can be said that the compound is an oxoacid compound and also is a lithium compound.

The content ratio of the oxoacid compound in the solid composition is not particularly limited, but is preferably 0.1 mass % or more and 20 mass % or less, more preferably 1.5 mass % or more and 15 mass % or less, further more preferably 2.0 mass % or more and 10 mass % or less.

According to this, the ion conductor P12 can be favorably obtained from the solid composition by the heat treatment at a lower temperature for a shorter time while more reliably preventing the oxoacid compound from undesirably remaining in the ion conductor P12 to be formed using the solid composition, and the ion conduction property of the ion conductor P12 to be obtained can be made particularly excellent.

When the content ratio of the precursor oxide in the solid composition is represented by XP [mass %] and the content ratio of the oxoacid compound in the solid composition is represented by XO [mass %], it is preferred to satisfy a relationship: $0.013 \leq XO/XP \leq 0.58$, it is more preferred to satisfy a relationship: $0.023 \leq XO/XP \leq 0.34$, and it is further more preferred to satisfy a relationship: $0.03 \leq XO/XP \leq 0.19$.

According to this, the ion conductor P12 can be favorably obtained from the solid composition by the heat treatment at a lower temperature for a shorter time while more reliably preventing the oxoacid compound from undesirably remaining in the ion conductor P12 to be formed using the solid composition, and the ion conduction property of the ion conductor P12 to be obtained can be made particularly excellent.

When the content ratio of the lithium compound in the solid composition is represented by XL [mass %] and the content ratio of the oxoacid compound in the solid composition is represented by XO [mass %], it is preferred to satisfy a relationship: $0.05 \leq XO/XL \leq 2$, it is more preferred to satisfy a relationship: $0.08 \leq XO/XL \leq 1.25$, and it is further more preferred to satisfy a relationship: $0.11 \leq XO/XL \leq 0.67$.

According to this, the ion conductor P12 can be favorably obtained from the solid composition by the heat treatment at a lower temperature for a shorter time while more reliably preventing the oxoacid compound from undesirably remaining in the ion conductor P12 to be formed using the solid composition, and the ion conduction property of the ion conductor P12 to be obtained can be made particularly excellent.

The solid composition may contain multiple types of oxoacid compounds. When the solid composition contains multiple types of oxoacid compounds, as the value of the content ratio of the oxoacid compound in the solid composition, the sum of the content ratios of the oxoacid compounds shall be adopted.

[2-1-1-2-4] Another Component

The solid composition contains the precursor oxide, the lithium compound, and the oxoacid compound as described above, but may further contain a component other than these. Hereinafter, among the components constituting the solid composition, a component other than the precursor oxide, the lithium compound, and the oxoacid compound is referred to as "another component".

As such another component contained in the solid composition, for example, an oxide having the same crystal phase as the ion conductor P12 to be formed using the solid composition, a solvent component used in the production process for the solid composition, or the like is exemplified.

The content ratio of such another component in the solid composition is not particularly limited, but is preferably 10 mass % or less, more preferably 5.0 mass % or less, further more preferably 0.5 mass % or less.

The solid composition may contain multiple types of components as such another component. In that case, as the value of the content ratio of another component in the solid composition, the sum of the content ratios of the components shall be adopted.

The solid composition can be obtained by performing the same treatment as performed in a drying step and a multiple oxide formation step described in a production method for a positive electrode active material composite body of the below-mentioned second embodiment for a mixed liquid described in the same production method for a positive electrode active material composite body of the second embodiment.

A mixture containing the positive electrode active material P11 and the solid composition can be obtained by mixing these. Further, in the preparation of the mixture, another component other than the positive electrode active material P11 and the solid composition may be used.

As such a component, for example, a dispersion medium for dispersing the positive electrode active material P11 and the solid composition, a binder, or the like is exemplified.

In particular, by using a liquid component that functions as a dispersion medium, for example, the mixture can be formed into a paste or the like, so that the flowability of the mixture, and the ease of handling thereof are improved.

However, the content ratio of such another component in the mixture is not particularly limited, but is preferably 20 mass % or less, more preferably 10 mass % or less, further more preferably 5 mass % or less.

[2-1-2] Molding Step

In the molding step, the mixture prepared in the mixture preparation step described above is molded, whereby a molded body is obtained.

As a molding method for obtaining the molded body, various molding methods can be adopted, and examples thereof include compression molding, extrusion molding, injection molding, various printing methods, and various coating methods.

The shape of the molded body obtained in this step is not particularly limited, but is generally a shape corresponding to the shape of the target positive electrode active material composite body P1. The molded body obtained in this step, for example, may have a shape and a size different from the target positive electrode active material composite body P1 in consideration of a portion to be removed in a later step, a shrinkage in the heat treatment step, or the like.

[2-1-3] Heat Treatment Step

In the heat treatment step, a heat treatment is performed for the molded body obtained in the molding step. By doing this, the solid composition is converted into the ion conductor P12, and the positive electrode active material composite body P1 including the positive electrode active material P11 and the ion conductor P12 is obtained.

The heating temperature of the molded body in the heat treatment step is not particularly limited, but is preferably 700° C. or higher and 1000° C. or lower, more preferably 730° C. or higher and 980° C. or lower, further more preferably 750° C. or higher and 950° C. or lower.

By performing heating at such a temperature, undesirable volatilization of a constituent metal element component of the solid composition, particularly a component having relatively high volatility such as Li can be more reliably prevented during heating while making the denseness of the positive electrode active material composite body P1 to be obtained sufficiently high, and the positive electrode active material composite body P1 having a desired composition can be more reliably obtained. Further, since the heating treatment is performed at a relatively low temperature, it is advantageous also from the viewpoint of saving energy, improvement of the productivity of the positive electrode active material composite body P1, and the like. In addition, it becomes easy to control the average decrease ratio of the content ratio of the transition metal element per 1 nm thickness of the ion conductor P12 from the interface P13 to a value within the above-mentioned range.

In this step, the heating temperature may be changed. For example, this step may include a first stage in which the heat treatment is performed while maintaining a relatively low temperature, and a second stage in which the temperature is raised after the first stage, and the heat treatment is performed at a relatively high temperature. In such a case, it is preferred that the highest temperature in this step falls within the above-mentioned range.

The heating time in this step is not particularly limited, but is preferably 5 minutes or more and 300 minutes or less, more preferably 10 minutes or more and 120 minutes or less, further more preferably 15 minutes or more and 60 minutes or less.

According to this, the above-mentioned effect is more remarkably exhibited.

This step may be performed in any atmosphere, and may be performed in an oxidizing atmosphere such as in the air or in an oxygen gas atmosphere, or may be performed in a non-oxidizing atmosphere of an inert gas such as nitrogen gas, helium gas, or argon gas, or the like. Further, this step may be performed under reduced pressure or vacuum, or under pressure. In particular, this step is preferably performed in an oxidizing atmosphere.

Further, in this step, the atmosphere may be maintained under substantially the same conditions, or may be changed to different conditions.

The positive electrode active material composite body P1 obtained as described above generally does not substantially contain the oxoacid compound contained in the solid composition used as the raw material. More specifically, the content ratio of the oxoacid compound in the positive electrode active material composite body P1 is generally 100 ppm or less, and particularly, it is preferably 50 ppm or less, more preferably 10 ppm or less.

According to this, the content ratio of an undesirable impurity in the positive electrode active material composite body P1 can be suppressed, and the characteristics and reliability of the positive electrode active material composite body P1 can be made more excellent.

[2-2] Production Method for Positive Electrode Active Material Composite Body of Second Embodiment Next, a production method of a second embodiment will be described.

Hereinafter, the production method of the second embodiment will be described, but different points from the above-mentioned embodiment will be mainly described, and the description of the same matter will be omitted.

In the production method for the positive electrode active material composite body P1 of this embodiment, the positive electrode active material composite body P1 is produced using a particle-containing composition containing a plurality of positive electrode active material composite particles each including a base particle constituted by the positive electrode active material P11, and a coating layer that is constituted by a solid composition containing a multiple oxide constituted by a crystal phase different from the crystal phase of the ion conductor P12 at normal temperature and normal pressure, a lithium compound, and an oxoacid compound, and that at least partially coats a surface of the base particle.

More specifically, the production method of this embodiment includes a particle-containing composition preparation step of preparing a particle-containing composition containing a plurality of positive electrode active material composite particles, a molding step of molding the particle-containing composition into a predetermined shape, thereby obtaining a molded body, and a heat treatment step of performing a heat treatment for the molded body, thereby obtaining the positive electrode active material composite body P1.

[2-2-1] Particle-Containing Composition Preparation Step

First, a particle-containing composition containing a plurality of positive electrode active material composite particles is prepared.

The positive electrode active material composite particles can be produced, for example, as follows.

That is, the positive electrode active material composite particles can be favorably produced using, for example, a method including a mixed liquid preparation step, a drying step, and a multiple oxide formation step.

The mixed liquid preparation step is a step of preparing a mixed liquid in which a metal compound containing a metal element constituting the above-mentioned precursor oxide in a molecule and a lithium compound are dissolved and also the positive electrode active material P11 is dispersed.

The drying step is a step of removing a liquid component from the mixed liquid, thereby obtaining a mixture in a solid state.

The multiple oxide formation step is a step of forming a multiple oxide by performing a heat treatment for the mixture in a solid state to cause a reaction of the metal compounds, thereby forming a coating layer constituted by a material containing the multiple oxide constituted by a crystal phase different from the crystal phase of the ion conductor P12 at normal temperature and normal pressure, a lithium compound, and an oxoacid compound, that is, a material corresponding to the solid composition described in the first embodiment at a surface of the positive electrode active material P11, which is used as a base particle.

Hereinafter, the respective steps will be described.

[2-2-1-1] Mixed Liquid Preparation Step

In the mixed liquid preparation step, a mixed liquid in which a metal compound containing a metal element constituting the above-mentioned precursor oxide in a molecule and a lithium compound are dissolved and also the positive electrode active material P11 is dispersed is prepared.

More specifically, in the mixed liquid preparation step, a mixed liquid in which a metal compound containing a metal element M, a lithium compound, and a zirconium compound are dissolved and also the positive electrode active material P11 is dispersed is prepared.

In the following description, a case where the ion conductor P12 is represented by a compositional formula: $Li_{7-x}La_3(Zr_{2-x}M_x)O_{12}$ will be mainly described.

The order of mixing of the respective components constituting the mixed liquid is not particularly limited, but for example, the mixed liquid can be obtained by mixing a lithium raw material solution in which a lithium compound is dissolved, a lanthanum raw material solution in which a lanthanum compound is dissolved, a zirconium raw material solution in which a zirconium compound is dissolved, a metal raw material solution in which a metal compound containing a metal element M is dissolved, and the positive electrode active material P11.

Further, in such a case, for example, the lithium raw material solution, the lanthanum raw material solution, the zirconium raw material solution, and the metal raw material solution may be mixed prior to mixing with the positive electrode active material P11. In other words, for example, the positive electrode active material P11 may be mixed with a mixed solution of the lithium raw material solution, the lanthanum raw material solution, the zirconium raw material solution, and the metal raw material solution.

In such a case, the positive electrode active material P11 may be subjected to mixing with the solution in a state of a dispersion liquid in which the positive electrode active material is dispersed in a dispersion medium.

As described above, when multiple types of liquids are used in the mixed liquid preparation step, with respect to these solutions and the dispersion liquid, the solvents and the dispersion medium as the constituent components may have a common composition, or may have different compositions.

In the mixed liquid preparation step, it is preferred to use the lithium compound so that the content ratio of lithium in the mixed liquid becomes 1.05 times or more and 1.2 times or less with respect to the stoichiometric composition of the above compositional formula.

Further, in the mixed liquid preparation step, it is preferred to use the lanthanum compound so that the content ratio of lanthanum in the mixed liquid is equivalent to the stoichiometric composition of the above compositional formula.

Further, in the mixed liquid preparation step, it is preferred to use the zirconium compound so that the content ratio of zirconium in the mixed liquid is equivalent to the stoichiometric composition of the above compositional formula.

Further, in the mixed liquid preparation step, it is preferred to use the metal compound containing the metal element M so that the content ratio of M in the mixed liquid is equivalent to the stoichiometric composition of the above compositional formula.

Examples of the lithium compound include lithium metal salts and lithium alkoxides, and among these, one type or a combination of two or more types can be used. Examples of the lithium metal salts include lithium chloride, lithium nitrate, lithium sulfate, lithium acetate, lithium hydroxide, lithium carbonate, and (2,4-pentanedionato)lithium. Further, examples of the lithium alkoxides include lithium methoxide, lithium ethoxide, lithium propoxide, lithium isopropoxide, lithium butoxide, lithium isobutoxide, lithium sec-butoxide, lithium tert-butoxide, and lithium dipivaloylmethanate. Among these, as the lithium compound, one type or two or more types selected from the group consisting of lithium nitrate, lithium sulfate, and (2,4-pentanedionato)lithium are preferred. As the lithium source, a hydrate may be used.

Further, examples of the lanthanum compound that is a metal compound as a lanthanum source include lanthanum metal salts, lanthanum alkoxides, and lanthanum hydroxide, and among these, one type or a combination of two or more types can be used. Examples of the lanthanum metal salts include lanthanum chloride, lanthanum nitrate, lanthanum sulfate, lanthanum acetate, and tris(2,4-pentanedionato)lanthanum. Examples of the lanthanum alkoxides include lanthanum trimethoxide, lanthanum triethoxide, lanthanum tripropoxide, lanthanum triisopropoxide, lanthanum tributoxide, lanthanum triisobutoxide, lanthanum tri-sec-butoxide, lanthanum tri-tert-butoxide, and lanthanum dipivaloylmethanate. Among these, as the lanthanum compound, at least one type selected from the group consisting of lanthanum nitrate, tris(2,4-pentanedionato) lanthanum, and lanthanum hydroxide is preferred. As the lanthanum source, a hydrate may be used.

Further, examples of the zirconium compound that is a metal compound as a zirconium source include zirconium metal salts and zirconium alkoxides, and among these, one type or a combination of two or more types can be used. Examples of the zirconium metal salts include zirconium chloride, zirconium oxychloride, zirconium oxynitrate, zirconium oxysulfate, zirconium oxyacetate, and zirconium acetate. Further, examples of the zirconium alkoxides include zirconium tetramethoxide, zirconium tetraethoxide, zirconium tetrapropoxide, zirconium tetraisopropoxide, zirconium tetrabutoxide, zirconium tetraisobutoxide, zirconium tetra-sec-butoxide, zirconium tetra-tert-butoxide, and zirconium dipivaloylmethanate. Among these, as the zirconium compound, zirconium tetraisobutoxide is preferred. As the zirconium source, a hydrate may be used.

Further, examples of a tantalum compound that is a metal compound as a tantalum source of the metal element M include tantalum metal salts and tantalum alkoxides, and among these, one type or a combination of two or more types can be used. Examples of the tantalum metal salts include tantalum chloride and tantalum bromide. Further, examples of the tantalum alkoxides include tantalum pentamethoxide, tantalum pentaethoxide, tantalum pentaisopropoxide, tantalum penta-n-propoxide, tantalum pentaisobutoxide, tantalum penta-n-butoxide, tantalum penta-sec-butoxide, and tantalum penta-tert-butoxide. Among these, as the tantalum compound, tantalum pentaethoxide is preferred. As the tantalum source, a hydrate may be used.

Further, examples of an antimony compound that is a metal compound as an antimony source of the metal element M include antimony metal salts and antimony alkoxides, and among these, one type or a combination of two or more types can be used. Examples of the antimony metal salts include antimony bromide, antimony chloride, and antimony fluoride. Further, examples of the antimony alkoxides include antimony trimethoxide, antimony triethoxide, antimony triisopropoxide, antimony tri-n-propoxide, antimony triisobutoxide, and antimony tri-n-butoxide. Among these, as the antimony compound, antimony triisobutoxide is preferred. As the antimony source, a hydrate may be used.

Further, examples of a niobium compound that is a metal compound as a niobium source of the metal element M include niobium metal salts, niobium alkoxides, and niobium acetylacetone, and among these, one type or a combination of two or more types can be used. Examples of the niobium metal salts include niobium chloride, niobium oxychloride, and niobium oxalate. Further, examples of the niobium alkoxides include niobium ethoxide such as niobium pentaethoxide, niobium propoxide, niobium isopropoxide, and niobium sec-butoxide. Among these, as the niobium compound, niobium pentaethoxide is preferred. As the niobium source, a hydrate may be used.

The solvent or the dispersion medium is not particularly limited, and for example, various types of organic solvents can be used, however, more specifically, for example, alcohols, glycols, ketones, esters, ethers, organic acids, aromatics, and amides are exemplified, and one type or a mixed solvent that is a combination of two or more types selected from these can be used. Examples of the alcohols include methyl alcohol, ethyl alcohol, n-propyl alcohol, isopropyl alcohol, n-butyl alcohol, allyl alcohol, and 2-n-butoxyethanol. Examples of the glycols include ethylene glycol, propylene glycol, butylene glycol, hexylene glycol, pentanediol, hexanediol, heptanediol, and dipropylene glycol. Examples of the ketones include dimethyl ketone, methyl ethyl ketone, methyl propyl ketone, and methyl isobutyl ketone. Examples of the esters include methyl formate, ethyl formate, methyl acetate, and methyl acetoacetate. Examples of the ethers include diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether. Examples of the organic acids include formic acid, acetic acid, 2-ethylbutyric acid, and propionic acid. Examples of the aromatics include toluene, o-xylene, and p-xylene. Examples of the amides include formamide, N,N-dimethylformamide, N,N-diethylformamide, dimethylacetamide, and N-methylpyrrolidone. Among these, as the solvent or the dispersion medium, at least one of 2-n-butoxyethanol and propionic acid is preferred.

Further, the mixed liquid prepared in this step preferably contains an oxoanion.

According to this, an oxoacid compound can be favorably incorporated in the positive electrode active material composite particles, and the above-mentioned effect can be more favorably exhibited. Further, the productivity of the positive electrode active material composite particles can be made excellent as compared with a case where an oxoanion is incorporated in a step later than this step. In addition, an undesirable variation in the composition in the positive electrode active material composite particles can be more effectively prevented.

In this step, when the mixed liquid is prepared as a liquid containing an oxoanion, it is preferred to use metal salts containing an oxoanion as the various types of metal compounds serving as the raw materials for forming the coating layer described above, however, in the preparation of the mixed liquid, an oxoacid compound containing an oxoanion may be further used as a component different from the various types of metal compounds.

Examples of the oxoanion include a halogen oxoacid, a borate ion, a carbonate ion, an orthocarbonate ion, a carboxylate ion, a silicate ion, a nitrite ion, a nitrate ion, a phosphorous ion, a phosphate ion, an arsenate ion, a sulfite ion, a sulfate ion, a sulfonate ion, and a sulfinate ion. Examples of the halogen oxoacid include a hypochlorous ion, a chlorite ion, a chlorate ion, a perchlorate ion, a hypobromite ion, a bromite ion, a bromate ion, a perbromate ion, a hypoiodite ion, an iodite ion, an iodate ion, and a periodate ion.

The oxoacid compound may be added at the timing later than the mixed liquid preparation step.

[2-2-1-2] Drying Step

The drying step is a step of removing a liquid component from the mixed liquid obtained in the mixed liquid preparation step, thereby obtaining a mixture in a solid state. Note that in the mixture in a solid state here, a mixture, a portion of which is in a gel state, shall also be included.

The mixture in a solid state obtained in this step need only be a mixture in which the liquid component contained in the mixed liquid, that is, the above-mentioned solvent or dispersion medium is at least partially removed, and need not be a mixture in which all the liquid component is removed.

This step can be carried out by performing, for example, a treatment using a centrifuge for the mixed liquid obtained in the mixed liquid preparation step, and removing the supernatant.

For the precipitate separated from the supernatant by centrifugation, further, a series of treatments of mixing with the mixed liquid, ultrasonic dispersion, and centrifugation may be performed predetermined times. By doing this, the thickness of the coating layer can be favorably adjusted.

Further, this step may be carried out by performing, for example, a heat treatment.

In that case, although the conditions for the heat treatment depend on the boiling point or vapor pressure of the solvent or the dispersion medium, or the like, the heating temperature in the heat treatment is preferably 50° C. or higher and 250° C. or lower, more preferably 60° C. or higher and 230° C. or lower, further more preferably 80° C. or higher and 200° C. or lower.

Further, the heating time in the heat treatment is preferably 10 minutes or more and 180 minutes or less, more preferably 20 minutes or more and 120 minutes or less, further more preferably 30 minutes or more and 60 minutes or less.

The heat treatment may be performed in any atmosphere, and may be performed in an oxidizing atmosphere such as in the air or in an oxygen gas atmosphere, or may be performed in a non-oxidizing atmosphere of an inert gas such as nitrogen gas, helium gas, or argon gas, or the like. Further, the heat treatment may be performed under reduced pressure or vacuum, or under pressure.

Further, in the heat treatment, the atmosphere may be maintained under substantially the same conditions, or may be changed to different conditions.

Further, in this step, treatments as described above may be performed in combination.

[2-2-1-3] Multiple Oxide Formation Step

In the multiple oxide formation step, a multiple oxide is formed by performing a heat treatment for the mixture in a solid state obtained in the drying step to cause a reaction of the metal compounds, thereby forming a coating layer constituted by a material containing the multiple oxide constituted by a crystal phase different from the crystal phase of the ion conductor P12 at normal temperature and normal pressure, the lithium compound, and the oxoacid compound at a surface of the positive electrode active material P11.

The multiple oxide formed in this step is different from the positive electrode active material constituting the positive electrode active material P11.

The heat treatment in this step may be performed under fixed conditions or may be performed by combining different conditions.

Although the conditions for the heat treatment in this step depend on the composition of the precursor oxide to be formed, or the like, the heating temperature in this step is preferably 400° C. or higher and 600° C. or lower, more preferably 430° C. or higher and 570° C. or lower, further more preferably 450° C. or higher and 550° C. or lower.

Further, the heating time in this step is preferably 5 minutes or more and 180 minutes or less, more preferably 10 minutes or more and 120 minutes or less, further more preferably 15 minutes or more and 60 minutes or less.

The heat treatment in this step may be performed in any atmosphere, and may be performed in an oxidizing atmosphere such as in the air or in an oxygen gas atmosphere, or may be performed in a non-oxidizing atmosphere of an inert gas such as nitrogen gas, helium gas, or argon gas, or the like. Further, this step may be performed under reduced pressure or vacuum, or under pressure. In particular, this step is preferably performed in an oxidizing atmosphere.

The average thickness of the coating layer of the positive electrode active material composite particles is preferably 0.002 μm or more and 3.0 μm or less, more preferably 0.03 μm or more and 2.0 μm or less, further more preferably 0.05 μm or more and 1.5 μm or less.

According to this, the size of the positive electrode active material composite particle and the ratio of the average thickness of the coating layer to the average particle diameter of the positive electrode active material P11 as the base particle are easily adjusted within a more favorable range. As a result, for example, the flowability of the positive electrode active material composite particles, and the ease of handling thereof are made more favorable, and further, the internal resistance of the positive electrode active material composite body P1 to be produced using the positive electrode active material composite particles can be further decreased, and it can be favorably applied to the production of a lithium-ion secondary battery having more excellent charge-discharge characteristics.

Note that in the present specification, the average thickness of the coating layer refers to a thickness of the coating layer determined from a ratio of the positive electrode active material P11 as the base particle to the coating layer contained in the entire powder that is an assembly of a plurality of positive electrode active material composite particles when it is assumed that each positive electrode active material P11 has a true spherical shape having the same diameter as the average particle diameter thereof, and the coating layer having a uniform thickness is formed at the entire outer surface of each positive electrode active material P11.

Further, when the average particle diameter of the positive electrode active material P11 as the base particle is represented by D [μm] and the average thickness of the coating layer is represented by T [μm], it is preferred to satisfy a relationship: $0.0004 \leq T/D \leq 1.0$, it is more preferred to satisfy a relationship: $0.0010 \leq T/D \leq 0.30$, and it is further more preferred to satisfy a relationship: $0.0020 \leq T/D \leq 0.15$.

According to this, the size of the positive electrode active material composite particle and the ratio of the average thickness of the coating layer to the average particle diameter of the positive electrode active material P11 as the base particle are easily adjusted within a more favorable range. As a result, for example, the flowability of the positive electrode active material composite particles, and the ease of handling thereof are made more favorable, and further, the internal resistance of the positive electrode active material composite body P1 to be produced using the positive electrode active material composite particles can be further decreased, and it can be favorably applied to the production of a lithium-ion secondary battery having more excellent charge-discharge characteristics.

The coating layer may be any as long as the layer at least partially coats the surface of the positive electrode active material P11 as the base particle, and a coating ratio of the coating layer to the outer surface of the positive electrode active material P11, that is, the ratio of the area of a coating portion of the coating layer to the entire area of the outer surface of the positive electrode active material P11 is not particularly limited, but is preferably 10% or more, more preferably 20% or more, further more preferably 30% or more. Further, the upper limit of the coating ratio may be 100% or less than 100%.

According to this, the internal resistance of the positive electrode active material composite body P1 to be produced using the positive electrode active material composite particles can be further decreased, and a lithium-ion secondary battery having more excellent charge-discharge characteristics can be favorably produced.

The ratio of the mass of the coating layer to the total mass of the positive electrode active material composite particles is preferably 0.00001 mass % or more and 20 mass % or less, more preferably 0.0001 mass % or more and 2 mass % or less, further more preferably 0.0005 mass % or more and 0.002 mass % or less.

According to this, the internal resistance of the positive electrode active material composite body P1 to be produced using the positive electrode active material composite particles can be further decreased, and a lithium-ion secondary battery having more excellent charge-discharge characteristics can be favorably produced.

The coating layer constituting the positive electrode active material composite particle may include portions having different conditions. For example, the coating layer includes a first portion that partially coats the surface of the positive electrode active material P11 as the base particle, and a second portion that coats a surface, which is not coated with the first portion, of the positive electrode active material P11, and the first portion and the second portion may have different compositions. Further, the coating layer constituting the positive electrode active material composite particle may be a stacked body including a plurality of layers having different compositions. In addition, the coating layer that coats the positive electrode active material P11 may have a plurality of regions having mutually different thicknesses.

A powder that is an assembly of a plurality of positive electrode active material composite particles may include positive electrode active material composite particles in which the conditions for the coating layers are mutually different. For example, the powder may include positive electrode active material composite particles in which the thicknesses of the coating layers are different, positive electrode active material composite particles in which the compositions of the coating layers are different, or the like as the positive electrode active material composite particles in which the conditions for the coating layers are different.

In the above description, a case where the positive electrode active material composite particles are produced using a method in which a heat treatment in the multiple oxide formation step is performed for the particles to which a solute of the mixed liquid is adhered as a solid component after the mixed liquid preparation step and the drying step using a centrifuge is representatively described, however, the production may be carried out by spraying and drying the mixed liquid obtained in the mixed liquid preparation step by a method such as a spray drying method. For the particles obtained by spraying and drying, a heat treatment corresponding to the above-mentioned multiple oxide formation step may be performed, or a treatment corresponding to the above-mentioned drying step and a treatment corresponding to the above-mentioned multiple oxide formation step may be performed in the same step by performing spraying and drying in a heated state.

[2-2-2] Molding Step

In the molding step, the particle-containing composition obtained as described above is molded into a predetermined shape, whereby a molded body is obtained.

In this step, a powder that is an assembly of a plurality of particles of the particle-containing composition can be used. Further, when the powder is used, for example, two or more types of powders, in which conditions for the positive electrode active material composite particles to be included, more specifically, conditions such as the average particle diameter of the positive electrode active material composite particles, the size or composition of the base particle constituting the positive electrode active material composite particle, or the thickness or composition of the coating layer are different, may be mixed and used. Further, in this step, a composition containing another component may be used in addition to the powder.

Examples of such a component include a dispersion medium for dispersing the positive electrode active material composite particles, a positive electrode active material that is not provided with the coating layer, solid electrolyte particles, composite particles in which the base particles of the positive electrode active material composite particles are replaced with another material, composite particles in which the coating layer of the positive electrode active material composite particles is replaced with another material, particles constituted by a material exemplified as the constituent material of the coating layer of the positive electrode active material composite particles, and a binder.

In particular, by using a dispersion medium, for example, the composition can be formed into a paste or the like, so that the flowability of the composition, and the ease of handling thereof are improved.

As a molding method for obtaining the molded body, various molding methods can be adopted, and examples thereof include compression molding, extrusion molding, injection molding, various printing methods, and various coating methods.

The shape of the molded body obtained in this step is not particularly limited, but is generally a shape corresponding to the shape of the target positive electrode active material composite body P1. The molded body obtained in this step, for example, may have a shape and a size different from the target positive electrode active material composite body P1 in consideration of a portion to be removed in a later step, a shrinkage in the heat treatment step, or the like.

[2-2-3] Heat Treatment Step

In the heat treatment step, a heat treatment is performed for the molded body obtained as described above, whereby the positive electrode active material composite body P1 is obtained.

The heat treatment in this embodiment can be performed under the same conditions as described in the first embodiment.

[3] Lithium-Ion Secondary Battery

Next, a lithium-ion secondary battery to which the present disclosure is applied will be described.

The lithium-ion secondary battery according to the present disclosure includes the positive electrode active material composite body according to the present disclosure as described above, and can be produced by, for example, applying the production method for a positive electrode active material composite body described above.

Such a lithium-ion secondary battery has a small internal resistance and excellent charge-discharge characteristics.

[3-1] Lithium-Ion Secondary Battery of First Embodiment

Hereinafter, a lithium-ion secondary battery according to a first embodiment will be described.

Figure 3:
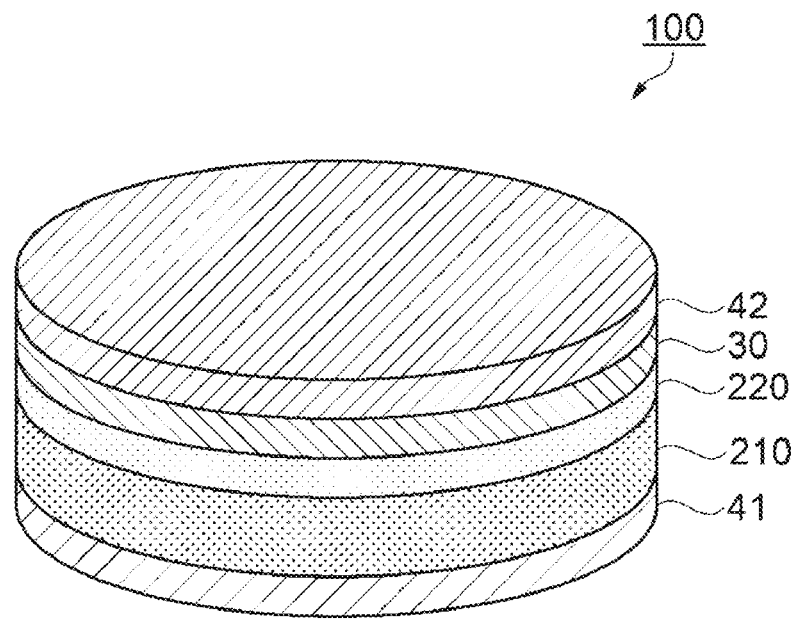
FIG. 3 is a schematic perspective view schematically showing a configuration of a lithium-ion secondary battery of a first embodiment.
Figure 4:
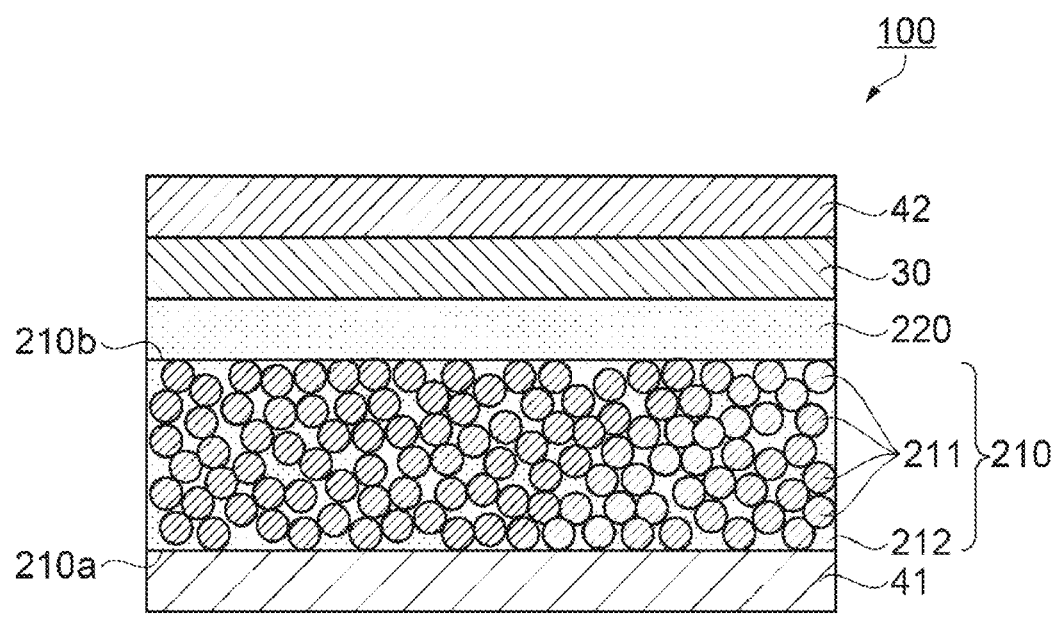
FIG. 4 is a schematic cross-sectional view schematically showing a structure of the lithium-ion secondary battery of the first embodiment.

FIG. 3 is a schematic perspective view schematically showing a configuration of the lithium-ion secondary battery of the first embodiment, and FIG. 4 is a schematic cross-sectional view schematically showing a structure of the lithium-ion secondary battery of the first embodiment.

As shown in FIG. 3, a lithium-ion secondary battery 100 of this embodiment includes a positive electrode composite material 210, which functions as a positive electrode, and to which the positive electrode active material composite body P1 described above is applied, and an electrolyte layer 220 and a negative electrode 30, which are sequentially stacked on the positive electrode composite material 210. The lithium-ion secondary battery further includes a current collector 41 in contact with the positive electrode composite material 210 at an opposite face side of the positive electrode composite material 210 from a face thereof facing the electrolyte layer 220, and includes a current collector 42 in contact with the negative electrode 30 at an opposite face side of the negative electrode 30 from a face thereof facing the electrolyte layer 220. The positive electrode composite material 210, the electrolyte layer 220, and the negative electrode 30 are all constituted by a solid phase, and therefore, the lithium-ion secondary battery 100 is a chargeable and dischargeable all solid-state battery.

The shape of the lithium-ion secondary battery 100 is not particularly limited, and may be, for example, a polygonal disk shape or the like, but is a circular disk shape in the configuration shown in the drawing. The size of the lithium-ion secondary battery 100 is not particularly limited, but the diameter of the lithium-ion secondary battery 100 is, for example, 10 mm or more and 20 mm or less, and the thickness of the lithium-ion secondary battery 100 is, for example, 0.1 mm or more and 1.0 mm or less.

When the lithium-ion secondary battery 100 is small and thin in this manner, together with the fact that it is chargeable and dischargeable and is an all solid-state battery, it can be favorably used as a power supply of a portable information terminal such as a smartphone. The lithium-ion secondary battery 100 may be used for a purpose other than the power supply of a portable information terminal as described later.

Hereinafter, the respective configurations of the lithium-ion secondary battery 100 will be described.

[3-1-1] Positive Electrode Composite Material

As shown in FIG. 4, the positive electrode composite material 210 in the lithium-ion secondary battery 100 includes a positive electrode active material 211 in a particulate shape and a solid electrolyte 212. In such a positive electrode composite material 210, the battery reaction rate in the lithium-ion secondary battery 100 can be further increased by increasing an interfacial area where the positive electrode active material 211 in a particulate shape and the solid electrolyte 212 are in contact with each other. Such a positive electrode composite material 210 is configured to apply the positive electrode active material composite body P1 according to the present disclosure described above. That is, the positive electrode active material 211 mainly corresponds to the positive electrode active material P11 of the positive electrode active material composite body P1, and the solid electrolyte 212 mainly corresponds to the ion conductor P12 of the positive electrode active material composite body P1.

The thickness of the positive electrode composite material 210 is not particularly limited, but is preferably 1.1 μm or more and 500 μm or less, more preferably 2.5 μm or more and 100 μm or less.

As a method for forming the positive electrode composite material 210, for example, a green sheet method, a press firing method, a cast firing method, or the like is exemplified. A specific example of the method for forming the positive electrode composite material 210 will be described in detail later. For the purpose of improvement of the adhesion between the positive electrode composite material 210 and the electrolyte layer 220, improvement of the output or battery capacity of the lithium-ion secondary battery 100 by an increase in specific surface area, or the like, for example, a three-dimensional pattern structure such as a dimple, trench, or pillar pattern may be formed at a surface of the positive electrode composite material 210 at a side in contact with the electrolyte layer 220.

[3-1-2] Electrolyte Layer

The electrolyte layer 220 is preferably constituted by the same material or the same type of material as the solid electrolyte 212 from the viewpoint of an interfacial impedance between the electrolyte layer 220 and the positive electrode composite material 210, but may be constituted by a material different from the solid electrolyte 212. For example, the electrolyte layer 220 may be formed using particles constituted by the same material as the solid composition described above. Further, the electrolyte layer 220 may be a crystalline material or an amorphous material of another oxide solid electrolyte, a sulfide solid electrolyte, a nitride solid electrolyte, a halide solid electrolyte, a hydride solid electrolyte, a dry polymer electrolyte, or a quasi-solid electrolyte, or may be constituted by a material in which two or more types selected from these are combined.

Examples of a crystalline oxide include $Li_{0.35}La_{0.55}TiO_3$, $Li_{0.2}La_{0.27}NbO_3$, and a perovskite-type crystal or a perovskite-like crystal in which the elements constituting a crystal thereof are partially substituted with N, F, Al, Sr, Sc, Nb, Ta, Sb, a lanthanoid element, or the like, $Li_7La_3Zr_2O_{12}$, $Li_5La_3Nb_2O_{12}$, $Li_5BaLa_2TaO_{12}$, and a garnet-type crystal or a garnet-like crystal in which the elements constituting a crystal thereof are partially substituted with N, F, Al, Sr, Sc, Nb, Ta, Sb, a lanthanoid element, or the like, $Li_{1.3}Ti_{1.7}Al_{0.3}(PO_4)_3$, $Li_{1.4}Al_{0.4}Ti_{1.6}(PO_4)_3$, $Li_{1.4}Al_{0.4}Ti_{1.4}Ge_{0.2}(PO_4)_3$, and a NASICON-type crystal in which the elements constituting a crystal thereof are partially substituted with N, F, Al, Sr, Sc, Nb, Ta, Sb, a lanthanoid element, or the like, a LISICON-type crystal such as $Li_{14}ZnGe_4O_{16}$, and other crystalline materials such as $Li_{3.4}V_{0.6}Si_{0.4}O_4$, $Li_{3.6}V_{0.4}Ge_{0.6}O_4$, and $Li_{2+x}C_{1-x}B_xO_3$.

Examples of a crystalline sulfide include $Li_{10}GeP_2S_{12}$, $Li_{9.6}P_3S_{12}$, $Li_{9.54}Si_{1.74}P_{1.44}S_{11.7}Cl_{0.3}$, and $Li_3PS_4$.

Examples of other amorphous materials include $Li_2O$—$TiO_2$, $La_2O_3$—$Li_2TiO_2$, $LiNbO_3$, $LiSO_4$, $Li_4SiO_4$, $Li_3PO_4$—$Li_4SiO_4$, $Li_4GeO_4$—$Li_3VO_4$, $Li_4SiO_4$—$Li_3VO_4$, $Li_4GeO_4$—$Zn_2GeO_2$, $Li_4SiO_4$—$LiMoO_4$, $Li_4SiO_4$—$Li_4ZrO_4$, $SiO_2$—$P_2O_5$—$Li_2O$, $SiO_2$—$P_2O_5$—$LiCl$, $Li_2O$—$LiCl$—$B_2O_3$, $LiAlCl_4$, $LiAlF_4$, $LiF$—$Al_2O_3$, $LiBr$—$Al_2O_3$, $Li_{2.88}PO_{3.73}N_{0.14}$, $Li_3N$—$LiCl$, $Li_6NBr_3$, $Li_2S$—$SiS_2$, and $Li_2S$—$SiS_2$—$P_2S_5$.

When the electrolyte layer 220 is constituted by a crystalline material, the crystalline material preferably has a crystal structure such as a cubic crystal having small crystal plane anisotropy in the direction of lithium ion conduction. Further, when the electrolyte layer 220 is constituted by an amorphous material, the anisotropy in lithium ion conduction becomes small. Therefore, the crystalline material and the amorphous material as described above are both preferred as a solid electrolyte constituting the electrolyte layer 220.

The thickness of the electrolyte layer 220 is preferably 0.1 μm or more and 100 μm or less, more preferably 0.2 μm or more and 10 μm or less. When the thickness of the electrolyte layer 220 is a value within the above range, the internal resistance of the electrolyte layer 220 can be further decreased, and also the occurrence of a short circuit between the positive electrode composite material 210 and the negative electrode 30 can be more effectively prevented.

For the purpose of improvement of the adhesion between the electrolyte layer 220 and the negative electrode 30, improvement of the output or battery capacity of the lithium-ion secondary battery 100 by an increase in specific surface area, for example, a three-dimensional pattern structure such as a dimple, trench, or pillar pattern may be formed at a surface of the electrolyte layer 220 at a side in contact with the negative electrode 30.

As a method for forming the electrolyte layer 220, for example, a vapor phase deposition method such as a vacuum vapor deposition method, a sputtering method, a CVD method, a PLD method, an ALD method, or an aerosol deposition method, a chemical deposition method using a solution such as a sol-gel method or an MOD method, or the like is exemplified. In that case, a heat treatment is performed after forming a film as needed, and the crystal phase of the constituent material of the formed film may be changed.

In addition, for example, fine particles of an electrolyte or a precursor of an electrolyte are formed into a slurry together with an appropriate binder, followed by squeegeeing or screen printing, thereby forming a coating film, and then, the coating film may be baked onto the surface of the electrolyte layer 220 by drying and firing. In that case, for example, as the precursor of the electrolyte, a material that satisfies the same conditions as the solid composition described above can be used.

[3-1-3] Negative Electrode

The negative electrode 30 may be any as long as it is constituted by a so-called negative electrode active material that repeats electrochemical occlusion and release of lithium ions at a lower potential than the positive electrode active material 211.

Specifically, examples of the negative electrode active material constituting the negative electrode 30 include $Nb_2O_5$, $V_2O_5$, $TiO_2$, $In_2O_3$, ZnO, $SnO_2$, NiO, ITO, AZO, GZO, ATO, FTO, and lithium multiple oxides such as $Li_4Ti_5O_{12}$ and $Li_2Ti_3O_7$. Further, additional examples thereof include metals and alloys such as Li, Al, Si, Si—Mn, Si—Co, Si—Ni, Sn, Zn, Sb, Bi, In, and Au, carbon materials, and materials obtained by intercalation of lithium ions between layers of a carbon material such as $LiC_{24}$ or $LiC_6$.

The negative electrode 30 is preferably formed as a thin film at one surface of the electrolyte layer 220 in consideration of an electric conduction property and an ion diffusion distance.

The thickness of the negative electrode 30 by the thin film is not particularly limited, but is preferably 0.1 μm or more and 500 μm or less, more preferably 0.3 μm or more and 100 μm or less.

As a method for forming the negative electrode 30, for example, a vapor phase deposition method such as a vacuum vapor deposition method, a sputtering method, a CVD method, a PLD method, an ALD method, or an aerosol deposition method, a chemical deposition method using a solution such as a sol-gel method or an MOD method, or the like is exemplified. In addition, for example, fine particles of the negative electrode active material are formed into a slurry together with an appropriate binder, followed by squeegeeing or screen printing, thereby forming a coating film, and then, the coating film may be baked onto the surface of the electrolyte layer 220 by drying and firing.

[3-1-4] Current Collector

The current collectors 41 and 42 are electric conductors provided so as to play a role in transfer of electrons to or from the positive electrode composite material 210 or the negative electrode 30. As the current collector, generally, a current collector constituted by a material that has a sufficiently small electrical resistance, and that does not substantially change the electric conduction characteristics or the mechanical structure thereof by charging and discharging is used. Specifically, as the constituent material of the current collector 41 of the positive electrode composite material 210, for example, Al, Ti, Pt, Au, or the like is used. Further, as the constituent material of the current collector 42 of the negative electrode 30, for example, Cu or the like is favorably used.

The current collectors 41 and 42 are generally provided so that the contact resistance thereof with the positive electrode composite material 210 or the negative electrode 30 becomes small. Examples of the shape of the current collector 41 or 42 include a plate shape and a mesh shape.

The thickness of each of the current collectors 41 and 42 is not particularly limited, but is preferably 7 μm or more and 85 μm or less, more preferably 10 μm or more and 60 μm or less.

In the configuration shown in the drawing, the lithium-ion secondary battery 100 includes a pair of current collectors 41 and 42, however, for example, when a plurality of lithium-ion secondary batteries 100 are used by being stacked and electrically coupled to one another in series, the lithium-ion secondary battery 100 can also be configured to include only the current collector 41 of the current collectors 41 and 42.

The lithium-ion secondary battery 100 may be used for any purpose. Examples of an electronic device to which the lithium-ion secondary battery 100 is applied as a power supply include a personal computer, a digital camera, a cellular phone, a smartphone, a music player, a tablet terminal, a timepiece, a smartwatch, various types of printers such as an inkjet printer, a television, a projector, wearable terminals such as a head-up display, a wireless headphone, wireless earphones, smartglasses, and a head-mounted display, a video camera, a videotape recorder, a car navigation device, a drive recorder, a pager, an electronic notebook, an electronic dictionary, an electronic translation machine, an electronic calculator, an electronic gaming device, a toy, a word processor, a work station, a robot, a television telephone, a television monitor for crime prevention, electronic binoculars, a POS terminal, a medical device, a fish finder, various types of measurement devices, a device for mobile terminal base stations, various types of meters for vehicles, railroad cars, airplanes, helicopters, ships, or the like, a flight simulator, and a network server. Further, the lithium-ion secondary battery 100 may be applied to moving objects such as a car and a ship. More specifically, it can be favorably applied as, for example, a storage battery for electric cars, plug-in hybrid cars, hybrid cars, fuel cell cars, or the like. In addition, it can also be applied to, for example, a power supply for household use, a power supply for industrial use, a storage battery for photovoltaic power generation, or the like.

[3-2] Lithium-Ion Secondary Battery of Second Embodiment

Hereinafter, a lithium-ion secondary battery according to a second embodiment will be described.

Figure 5:
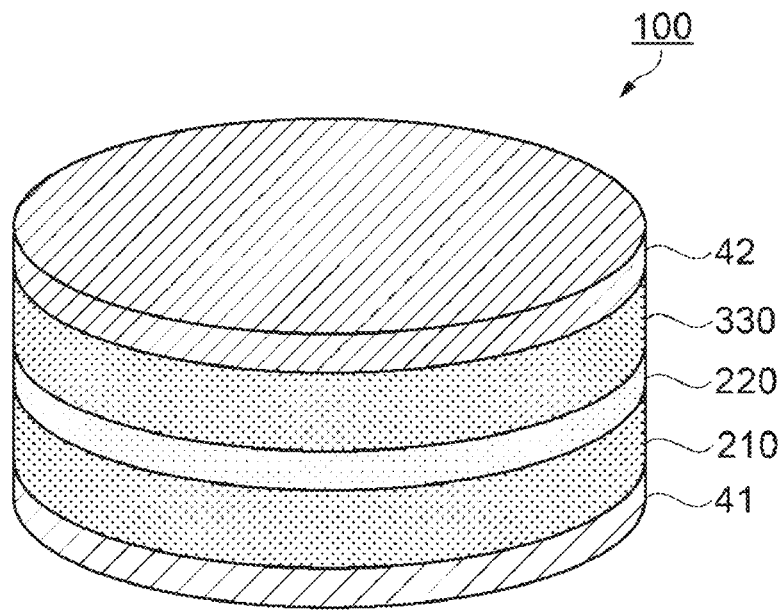
FIG. 5 is a schematic perspective view schematically showing a configuration of a lithium-ion secondary battery of a second embodiment.
Figure 6:
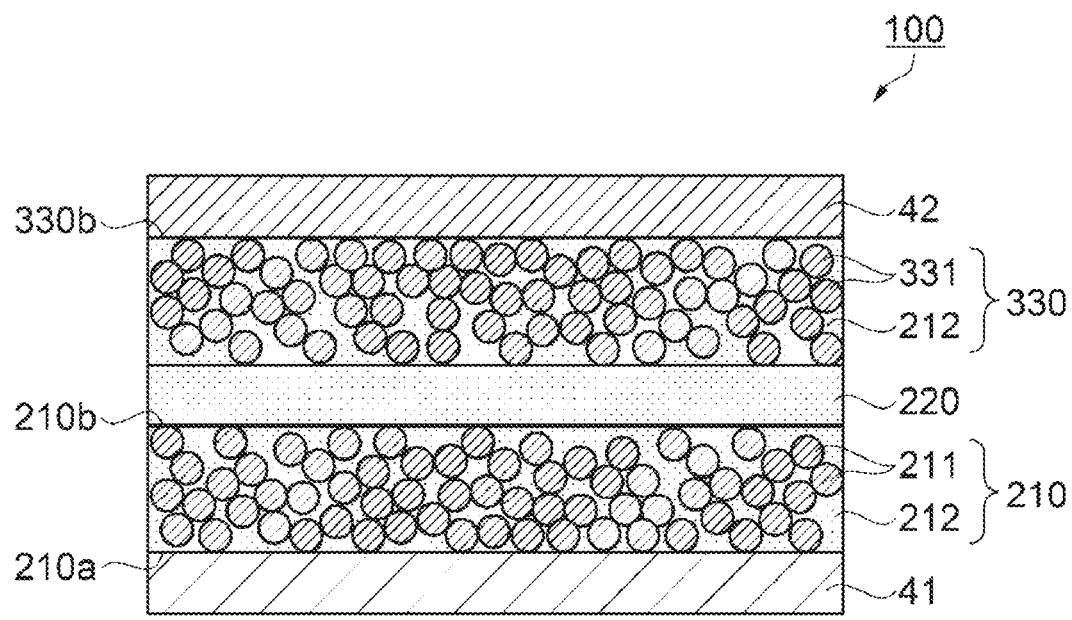
FIG. 6 is a schematic cross-sectional view schematically showing a structure of the lithium-ion secondary battery of the second embodiment.

FIG. 5 is a schematic perspective view schematically showing a configuration of the lithium-ion secondary battery of the second embodiment, and FIG. 6 is a schematic cross-sectional view schematically showing a structure of the lithium-ion secondary battery of the second embodiment.

Hereinafter, the lithium-ion secondary battery according to the second embodiment will be described with reference to these drawings, but different points from the abovementioned embodiment will be mainly described, and the description of the same matter will be omitted.

As shown in FIG. 5, a lithium-ion secondary battery 100 of this embodiment includes a positive electrode composite material 210, and an electrolyte layer 220 and a negative electrode composite material 330, which are sequentially stacked on the positive electrode composite material 210. The lithium-ion secondary battery further includes a current collector 41 in contact with the positive electrode composite material 210 at an opposite face side of the positive electrode composite material 210 from a face thereof facing the electrolyte layer 220, and includes a current collector 42 in contact with the negative electrode composite material 330 at an opposite face side of the negative electrode composite material 330 from a face thereof facing the electrolyte layer 220.

Hereinafter, the negative electrode composite material 330 that is different from the configuration of the lithium-ion secondary battery 100 according to the above-mentioned embodiment will be described.

[3-2-1] Negative Electrode Composite Material

As shown in FIG. 6, the negative electrode composite material 330 in the lithium-ion secondary battery 100 of this embodiment includes a negative electrode active material 331 in a particulate shape and a solid electrolyte 212. In such a negative electrode composite material 330, the battery reaction rate in the lithium-ion secondary battery 100 can be further increased by increasing an interfacial area where the negative electrode active material 331 in a particulate shape and the solid electrolyte 212 are in contact with each other.

The average particle diameter of the negative electrode active material 331 is not particularly limited, but is preferably 0.1 μm or more and 150 μm or less, more preferably 0.3 μm or more and 60 μm or less.

According to this, an actual capacity density close to the theoretical capacity of the negative electrode active material 331 and a high charge-discharge rate are easily achieved at the same time.

The particle size distribution of the negative electrode active material 331 is not particularly limited, and for example, in the particle size distribution having one peak, the half width of the peak can be set to 0.1 μm or more and 18 μm or less. Further, the particle size distribution of the negative electrode active material 331 may have two or more peaks.

In FIG. 6, the shape of the negative electrode active material 331 in a particulate shape is shown as a spherical shape, however, the shape of the negative electrode active material 331 is not limited to the spherical shape, and can have various shapes, for example, a columnar shape, a plate shape, a scaly shape, a hollow shape, an indefinite shape, and the like, and further, two or more types among these may be mixed.

Examples of the negative electrode active material 331 include the same materials as exemplified as the constituent material of the negative electrode 30 in the above-mentioned first embodiment.

In this embodiment, the negative electrode composite material 330 includes the solid electrolyte 212 in addition to the negative electrode active material 331. The solid electrolyte 212 is present so as to fill up a gap between particles of the negative electrode active material 331 or so as to be in contact with, particularly adhere to the surface of the negative electrode active material 331.

According to this, the ion conductivity in the solid electrolyte 212 becomes particularly excellent. Further, the adhesion of the solid electrolyte 212 to the negative electrode active material 331 or the electrolyte layer 220 can be made excellent. Accordingly, the characteristics and reliability of the lithium-ion secondary battery 100 as a whole can be made particularly excellent.

When the content ratio of the negative electrode active material 331 in the negative electrode composite material 330 is represented by XB [mass %] and the content ratio of the solid electrolyte 212 in the negative electrode composite material 330 is represented by XS [mass %], it is preferred to satisfy a relationship: $0.14 \leq XS/XB \leq 26$, it is more preferred to satisfy a relationship: $0.44 \leq XS/XB \leq 4.1$, and it is further more preferred to satisfy a relationship: $0.89 \leq XS/XB \leq 2.1$.

Further, the negative electrode composite material 330 may include an electric conduction assistant, a binder, or the like other than the negative electrode active material 331 and the solid electrolyte 212.

As the electric conduction assistant, any material may be used as long as it is an electric conductor whose electrochemical interaction can be ignored at a positive electrode reaction potential, and more specifically, for example, a carbon material such as acetylene black, Ketjen black, or a carbon nanotube, a noble metal such as palladium or platinum, an electric conductive oxide such as $SnO_2$, ZnO, $RuO_2$, $ReO_3$, or $Ir_2O_3$, or the like can be used.

The thickness of the negative electrode composite material 330 is not particularly limited, but is preferably 0.1 μm or more and 500 μm or less, more preferably 0.3 μm or more and 100 μm or less.

In the first and second embodiments, another layer may be provided between respective layers or at a surface of a layer constituting the lithium-ion secondary battery 100. Examples of such a layer include an adhesive layer, an insulating layer, and a protective layer.

[4] Production Method for Lithium-Ion Secondary Battery

Next, a production method for the above-mentioned lithium-ion secondary battery will be described.

In a production method for a lithium-ion secondary battery according to the present disclosure, for example, the production method for a positive electrode active material composite body described above can be applied.

[4-1] Production Method for Lithium-Ion Secondary Battery of First Embodiment

Hereinafter, a production method for a lithium-ion secondary battery according to a first embodiment will be described.

Figure 7:
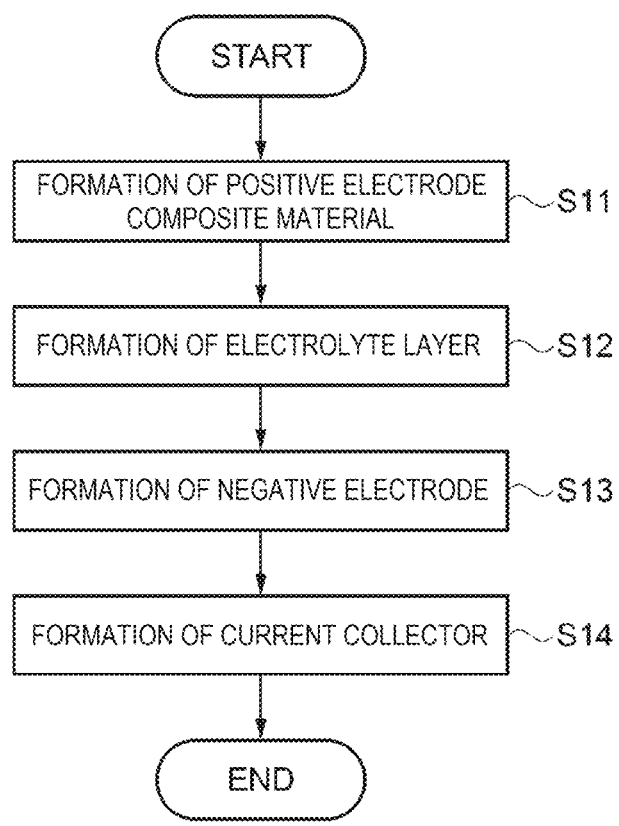
FIG. 7 is a flowchart showing a production method for a lithium-ion secondary battery of a first embodiment.
Figure 8:
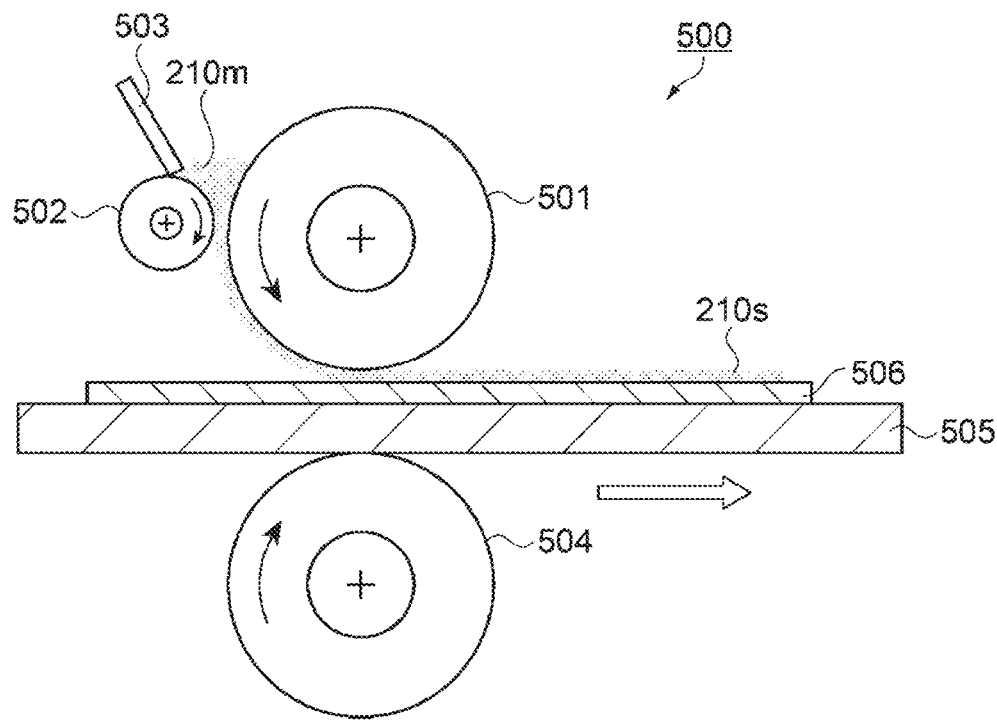
FIG. 8 is a schematic view schematically showing the production method for a lithium-ion secondary battery of the first embodiment.
Figure 9:
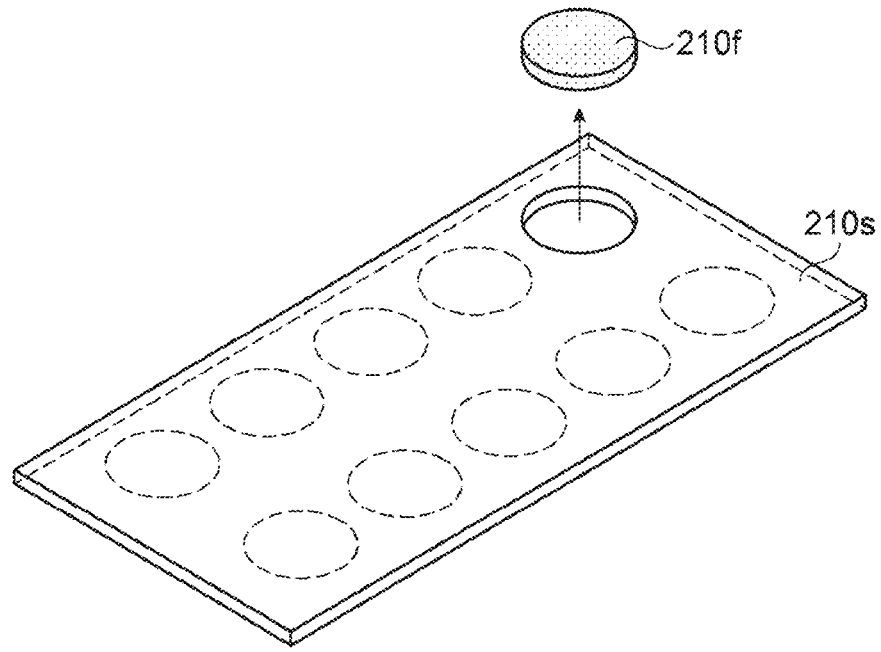
FIG. 9 is a schematic view schematically showing the production method for a lithium-ion secondary battery of the first embodiment.
Figure 10:
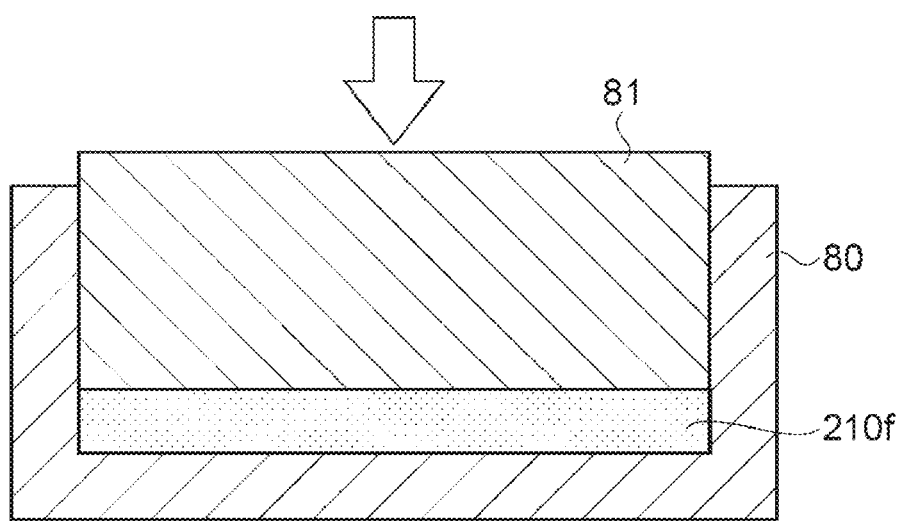
FIG. 10 is a schematic cross-sectional view schematically showing another method for forming a positive electrode composite material.

FIG. 7 is a flowchart showing the production method for a lithium-ion secondary battery of the first embodiment, FIGS. 8 and 9 are schematic views schematically showing the production method for a lithium-ion secondary battery of the first embodiment, and FIG. 10 is a schematic cross-sectional view schematically showing another method for forming a positive electrode composite material.

As shown in FIG. 7, the production method for the lithium-ion secondary battery 100 of this embodiment includes Step S11, Step S12, Step S13, and Step S14.

Step S11 is a step of forming the positive electrode composite material 210. Step S12 is a step of forming the electrolyte layer 220. Step S13 is a step of forming the negative electrode 30. Step S14 is a step of forming the current collectors 41 and 42.

[4-1-1] Step S11

In the step of forming the positive electrode composite material 210 of Step S11, for example, by applying the production method for a positive electrode active material composite body according to the first embodiment or the second embodiment described above, the positive electrode composite material 210 is formed by, for example, a green sheet method. More specifically, the positive electrode composite material 210 can be formed as follows.

That is, first, for example, a solution in which a binder such as polypropylene carbonate is dissolved in a solvent such as 1,4-dioxane is prepared, and the solution and the mixture described in the production method for a positive electrode active material composite body according to the above-mentioned first embodiment or the particle-containing composition described in the production method for a positive electrode active material composite body according to the above-mentioned second embodiment are mixed, whereby a slurry 210m is obtained. In the preparation of the slurry 210m, a dispersant, a diluent, a humectant, or the like may be further used as needed.

Subsequently, by using the slurry 210m, a positive electrode composite material forming sheet 210s is formed. More specifically, as shown in FIG. 8, for example, by using a fully automatic film applicator 500, the slurry 210m is applied to a predetermined thickness onto a base material 506 such as a polyethylene terephthalate film, whereby the positive electrode composite material forming sheet 210s is formed. The fully automatic film applicator 500 includes an application roller 501 and a doctor roller 502. A squeegee 503 is provided so as to come in contact with the doctor roller 502 from above. A conveyance roller 504 is provided below the application roller 501 at a position opposite thereto, and a stage 505 on which the base material 506 is placed is conveyed in a fixed direction by inserting the stage 505 between the application roller 501 and the conveyance roller 504. The slurry 210m is fed at a side where the squeegee 503 is provided between the application roller 501 and the doctor roller 502 disposed with a gap therebetween in the conveyance direction of the stage 505. The slurry 210m with a predetermined thickness is applied to the surface of the application roller 501 by rotating the application roller 501 and the doctor roller 502 so as to extrude the slurry 210m downward from the gap. Then, along with this, by rotating the conveyance roller 504, the stage 505 is conveyed so that the base material 506 comes in contact with the application roller 501 to which the slurry 210m has been applied. By doing this, the slurry 210m applied to the application roller 501 is transferred in a sheet form to the base material 506, whereby the positive electrode composite material forming sheet 210s is formed.

Thereafter, the solvent is removed from the positive electrode composite material forming sheet 210s formed on the base material 506, and the positive electrode composite material forming sheet 210s is detached from the base material 506 and punched to a predetermined size using a punching die as shown in FIG. 9, whereby a molded material 210f is formed. This treatment corresponds to the molding step in the production method for a positive electrode active material composite body described above.

Thereafter, a heating step of heating the molded material 210f is performed, whereby the positive electrode composite material 210 including the positive electrode active material 211 and the solid electrolyte 212 is obtained. This treatment corresponds to the heat treatment step in the production method for a positive electrode active material composite body described above. Therefore, this treatment is preferably performed under the same conditions as described in the above [2-1-3] Heat Treatment Step. According to this, the same effect as described above is obtained.

The positive electrode composite material forming sheet 210s with a predetermined thickness may be formed by pressing and extruding the slurry 210m by the application roller 501 and the doctor roller 502 so that the sintered density of the positive electrode composite material 210 after firing becomes 90% or more.

[4-1-2] Step S12

After Step S11, the process proceeds to Step S12.

In the step of forming the electrolyte layer 220 of Step S12, the electrolyte layer 220 is formed at one face 210b of the positive electrode composite material 210. More specifically, for example, by using a sputtering device, sputtering is performed using $LiCoO_2$ as a target in an inert gas such as argon gas, whereby a $LiCoO_2$ layer is formed at a surface of the positive electrode composite material 210. Thereafter, the $LiCoO_2$ layer formed on the positive electrode composite material 210 is fired in an oxidizing atmosphere so as to convert the crystal of the $LiCoO_2$ layer into a high-temperature phase crystal, whereby the $LiCoO_2$ layer can be converted into the electrolyte layer 220. The firing conditions for the $LiCoO_2$ layer are not particularly limited, but the heating temperature can be set to 400° C. or higher and 600° C. or lower, and the heating time can be set to 1 hour or more and 3 hours or less.

[4-1-3] Step S13

After Step S12, the process proceeds to Step S13.

In the step of forming the negative electrode 30 of Step S13, the negative electrode 30 is formed at an opposite face side of the electrolyte layer 220 from a face thereof facing the positive electrode composite material 210. More specifically, the negative electrode 30 can be formed by forming a thin film of metal Li at an opposite face side of the electrolyte layer 220 from a face thereof facing the positive electrode composite material 210 using, for example, a vacuum deposition device or the like.

[4-1-4] Step S14

After Step S13, the process proceeds to Step S14.

In the step of forming the current collectors 41 and 42 of Step S14, the current collector 41 is formed so as to come in contact with the other face of the positive electrode composite material 210, that is, a face 210a at an opposite side to the face 210b at which the electrolyte layer 220 is formed, and the current collector 42 is formed so as to come in contact with the negative electrode 30. More specifically, for example, an aluminum foil formed into a circular shape by punching or the like is joined to the positive electrode composite material 210 by pressing, whereby the current collector 41 can be formed. Further, for example, a copper foil formed into a circular shape by punching or the like is joined to the negative electrode 30 by pressing, whereby the current collector 42 can be formed. The thickness of each of the current collectors 41 and 42 is not particularly limited, but can be set to, for example, 10 μm or more and 60 μm or less. In this step, only one of the current collectors 41 and 42 may be formed.

The method for forming the positive electrode composite material 210 is not limited to the green sheet method shown in Step S11. As another method for forming the positive electrode composite material 210, for example, a method as described below can be adopted. That is, as shown in FIG. 10, the molded material 210f may be obtained by filling the mixture described in the production method for a positive electrode active material composite body according to the above-mentioned first embodiment or the particle-containing composition described in the production method for a positive electrode active material composite body according to the above-mentioned second embodiment in a pellet die 80, closing the pellet die using a lid 81, and pressing the lid 81 to perform uniaxial press molding. A treatment for the molded material 210f thereafter can be performed in the same manner as described above. As the pellet die 80, a die including an exhaust port (not shown) can be favorably used.

[4-2] Production Method for Lithium-Ion Secondary Battery of Second Embodiment

Next, a production method for a lithium-ion secondary battery according to a second embodiment will be described.

Figure 11:
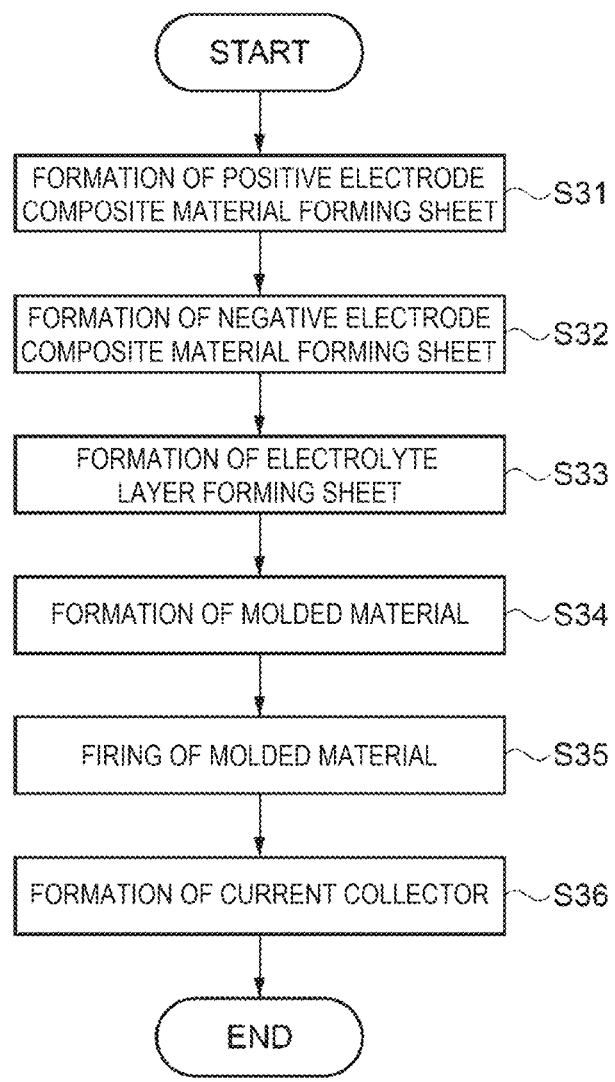
FIG. 11 is a flowchart showing a production method for a lithium-ion secondary battery of a second embodiment.
Figure 12:
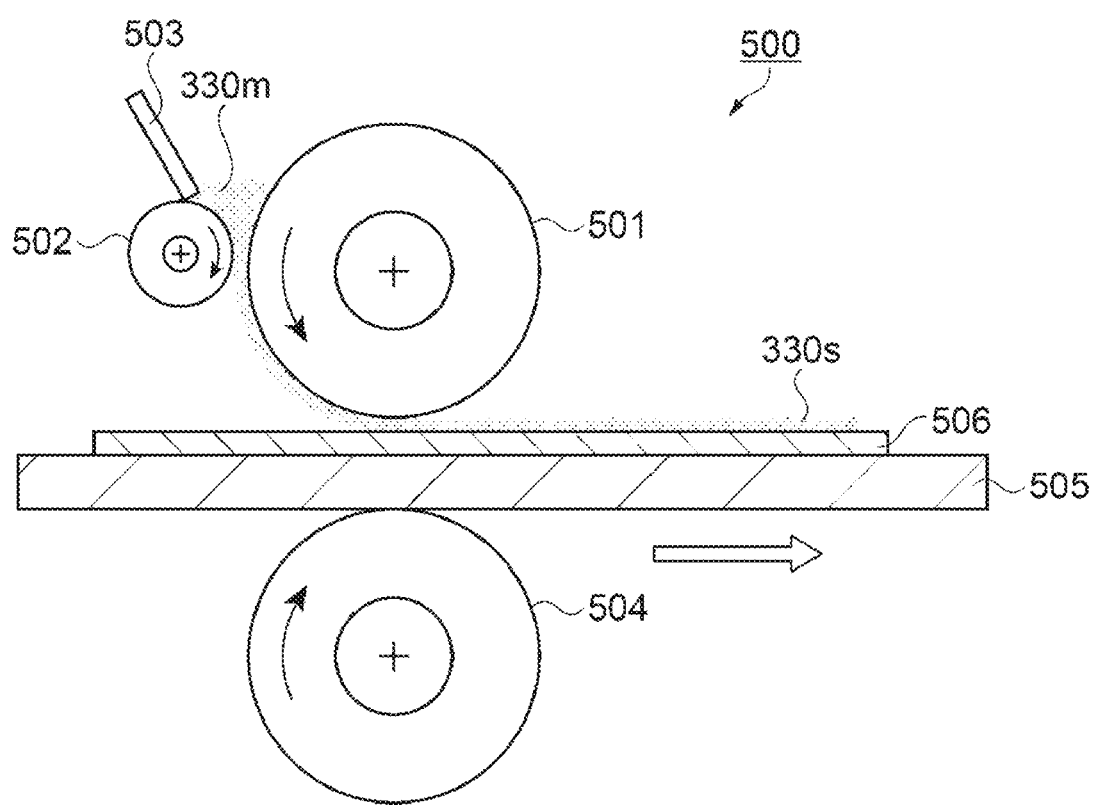
FIG. 12 is a schematic view schematically showing the production method for a lithium-ion secondary battery of the second embodiment.
Figure 13:
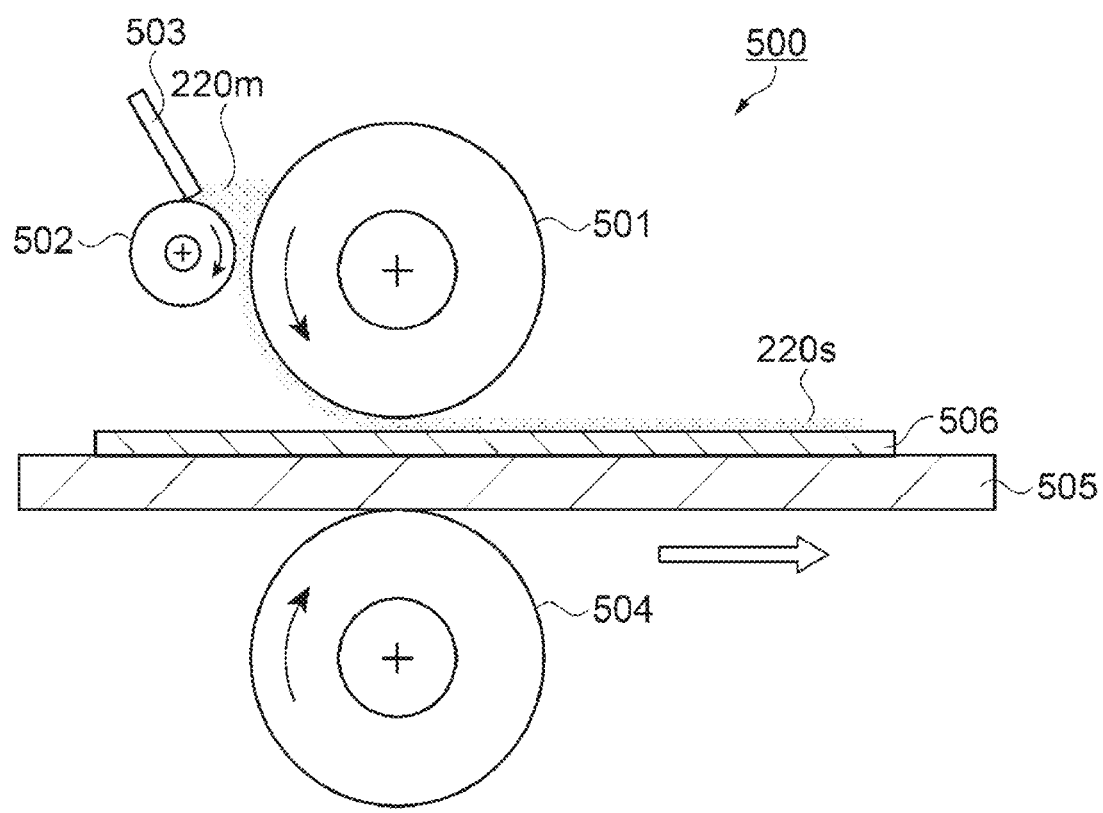
FIG. 13 is a schematic view schematically showing the production method for a lithium-ion secondary battery of the second embodiment.
Figure 14:
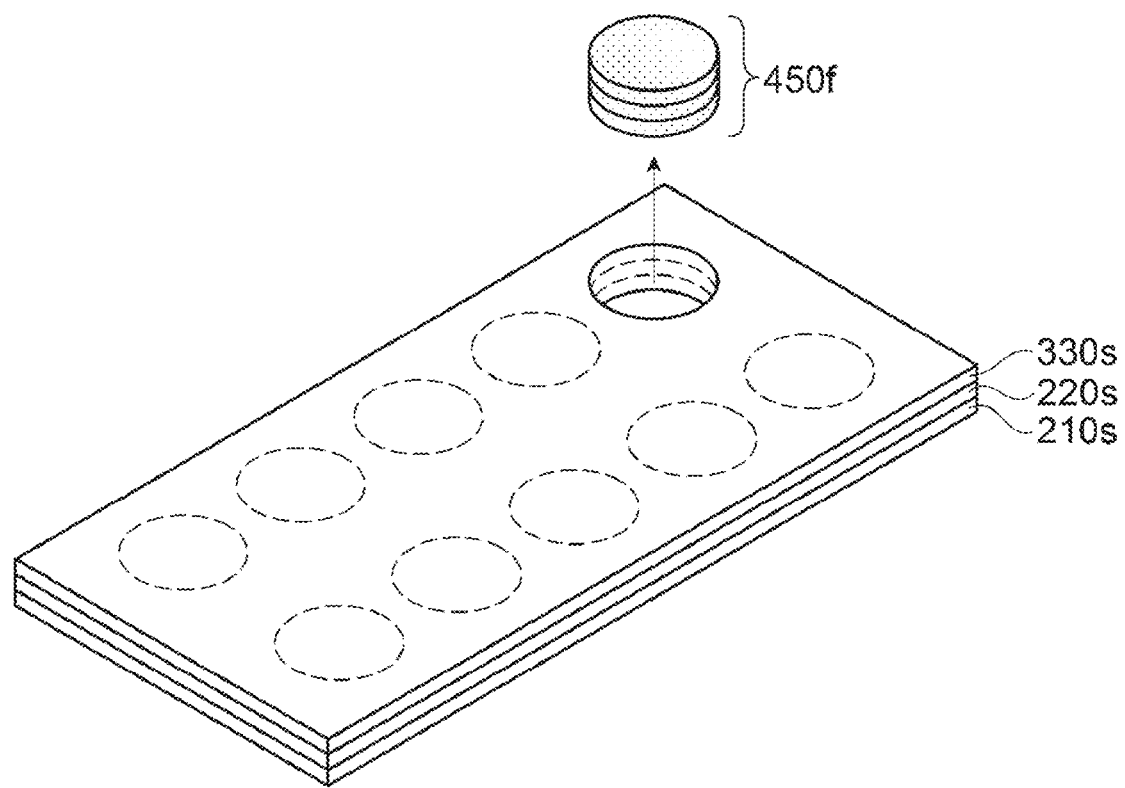
FIG. 14 is a schematic view schematically showing the production method for a lithium-ion secondary battery of the second embodiment.

FIG. 11 is a flowchart showing the production method for a lithium-ion secondary battery of the second embodiment, and FIGS. 12, 13 and 14 are schematic views schematically showing the production method for a lithium-ion secondary battery of the second embodiment.

Hereinafter, the production method for a lithium-ion secondary battery according to the second embodiment will be described with reference to these drawings, but different points from the above-mentioned embodiment will be mainly described, and the description of the same matter will be omitted.

As shown in FIG. 11, the production method for the lithium-ion secondary battery 100 of this embodiment includes Step S31, Step S32, Step S33, Step S34, Step S35, and Step S36.

Step S31 is a step of forming a sheet for forming the positive electrode composite material 210. Step S32 is a step of forming a sheet for forming the negative electrode composite material 330. Step S33 is a step of forming a sheet for forming the electrolyte layer 220. Step S34 is a step of forming a molded material 450*f* of molding a stacked body of the sheet for forming the positive electrode composite material 210, the sheet for forming the negative electrode composite material 330, and the sheet for forming the electrolyte layer 220 into a predetermined shape. Step S35 is a step of firing the molded material 450*f*. Step S36 is a step of forming the current collectors 41 and 42.

In the following description, a description will be given by assuming that Step S32 is performed after Step S31, and Step S33 is performed after Step S32, however, the order of Step S31, Step S32, and Step S33 is not limited thereto, and the order of the steps may be changed, or the steps may be concurrently performed.

[4-2-1] Step S31

In the step of forming a sheet for forming the positive electrode composite material 210 of Step S31, the positive electrode composite material forming sheet 210*s* that is the sheet for forming the positive electrode composite material 210 is formed.

The positive electrode composite material forming sheet 210*s* can be formed by, for example, the same method as described in the above-mentioned first embodiment.

The positive electrode composite material forming sheet 210*s* obtained in this step is preferably one obtained by removing the solvent from the slurry 210*m* used for forming the positive electrode composite material forming sheet 210*s*.

[4-2-2] Step S32

After Step S31, the process proceeds to Step S32.

In the step of forming a sheet for forming the negative electrode composite material 330 of Step S32, a negative electrode composite material forming sheet 330*s* that is the sheet for forming the negative electrode composite material 330 is formed using a slurry 330*m*.

More specifically, as shown in FIG. 12, for example, by using the fully automatic film applicator 500, the slurry 330*m* is applied to a predetermined thickness onto the base material 506 such as a polyethylene terephthalate film, whereby the negative electrode composite material forming sheet 330*s* is formed.

Thereafter, the solvent is removed from the negative electrode composite material forming sheet 330*s* formed on the base material 506, and the negative electrode composite material forming sheet 330*s* is detached from the base material 506.

As the slurry 330*m*, for example, a composition containing a binder such as polypropylene carbonate, a solvent such as 1,4-dioxane, negative electrode active material particles, and fine particles of an electrolyte or a precursor of an electrolyte can be used. As the fine particles of a precursor of an electrolyte, for example, particles constituted by the same material as the solid composition described above can be used. The slurry 330*m* may further contain a dispersant, a diluent, a humectant, or the like as needed.

[4-2-3] Step S33

After Step S32, the process proceeds to Step S33.

In the step of forming a sheet for forming the electrolyte layer 220 of Step S33, an electrolyte layer forming sheet 220*s* that is the sheet for forming the electrolyte layer 220 is formed.

In the step of forming a sheet for forming the electrolyte layer 220, the electrolyte layer forming sheet 220*s* that is the sheet for forming the electrolyte layer 220 is formed using a slurry 220*m*.

More specifically, as shown in FIG. 13, for example, by using the fully automatic film applicator 500, the slurry 220*m* is applied to a predetermined thickness onto the base material 506 such as a polyethylene terephthalate film, whereby the electrolyte layer forming sheet 220*s* is formed.

As the slurry 220*m*, for example, a composition containing a binder such as polypropylene carbonate, a solvent such as 1,4-dioxane, and fine particles of an electrolyte or a precursor of an electrolyte can be used. As the fine particles of a precursor of an electrolyte, for example, particles constituted by the same material as the solid composition described above can be used. The slurry 220*m* may further contain a dispersant, a diluent, a humectant, or the like as needed.

Thereafter, the solvent is removed from the electrolyte layer forming sheet 220*s* formed on the base material 506, and the electrolyte layer forming sheet 220*s* is detached from the base material 506.

[4-2-4] Step S34

After Step S33, the process proceeds to Step S34.

In the step of forming the molded material 450*f* of Step S34, the positive electrode composite material forming sheet 210*s*, the electrolyte layer forming sheet 220*s*, and the negative electrode composite material forming sheet 330*s* are pressed in a state of being stacked in this order and bonded to one another. Thereafter, as shown in FIG. 14, a stacked sheet obtained by bonding the sheets to one another is punched, whereby the molded material 450*f* is obtained. This treatment corresponds to the molding step in the production method for a positive electrode active material composite body described above.

[4-2-5] Step S35

After Step S34, the process proceeds to Step S35.

In the step of firing the molded material 450*f* of Step S35, by performing a heating step of heating the molded material 450*f*, a portion constituted by the positive electrode composite material forming sheet 210*s* is converted into the positive electrode composite material 210, a portion constituted by the electrolyte layer forming sheet 220*s* is converted into the electrolyte layer 220, and a portion constituted by the negative electrode composite material forming sheet 330*s* is converted into the negative electrode composite material 330. That is, a fired body of the molded material 450*f* is a stacked body of the positive electrode composite material 210, the electrolyte layer 220, and the negative electrode composite material 330. This treatment corresponds to the heat treatment step in the production method for a positive electrode active material composite body described above. Therefore, this treatment is preferably performed under the same conditions as described in the above [2-1-3] Heat Treatment Step. According to this, the same effect as described above is obtained.

[4-2-6] Step S36

After Step S35, the process proceeds to Step S36.

In the step of forming the current collectors 41 and 42 of Step S36, the current collector 41 is formed so as to come in contact with the face 210a of the positive electrode composite material 210, and the current collector 42 is formed so as to come in contact with a face 330b of the negative electrode composite material 330.

Hereinabove, preferred embodiments of the present disclosure have been described, however, the present disclosure is not limited thereto.

For example, the positive electrode active material composite body according to the present disclosure is not limited to one produced by the above-mentioned method.

More specifically, the positive electrode active material composite body according to the present disclosure may be one produced using a method combining the production method for a positive electrode active material composite body of the first embodiment and the production method for a positive electrode active material composite body of the second embodiment.

Further, when the present disclosure is applied to a lithium-ion secondary battery, the configuration of the lithium-ion secondary battery is not limited to those of the above-mentioned embodiments.

Further, when the present disclosure is applied to a lithium-ion secondary battery, the production method therefor is not limited to those of the above-mentioned embodiments. For example, the order of the steps in the production of the lithium-ion secondary battery may be different from the above-mentioned embodiments.

EXAMPLES

Next, specific Examples of the present disclosure will be described.

[5] Production of Positive Electrode Active Material Composite Body

Example 1

First, a first solution containing lanthanum nitrate hexahydrate as a lanthanum source, zirconium tetrabutoxide as a zirconium source, antimony tri-n-butoxide as an antimony source, tantalum pentaethoxide as a tantalum source, and 2-n-butoxyethanol as a solvent at a predetermined ratio was prepared, and a second solution containing lithium nitrate as a lithium compound and 2-n-butoxyethanol as a solvent at a predetermined ratio was prepared.

Subsequently, the first solution and the second solution were mixed at a predetermined ratio, whereby a mixed liquid in which the content ratio of Li, La, Zr, Ta, and Sb is 6.3:3:1.3:0.5:0.2 in molar ratio was obtained.

Subsequently, the thus obtained mixed liquid was subjected to a first heat treatment in the air at 140° C. for 20 minutes in a state of being placed in a beaker made of titanium, whereby a mixture in a gel form was obtained.

Subsequently, the thus obtained mixture in a gel form was subjected to a second heat treatment in the air at 540° C. for 35 minutes, whereby a solid composition that is a thermally decomposed material in an ash form was obtained.

The thus obtained solid composition was a composition containing a precursor oxide constituted by a pyrochlore-type crystal phase and lithium carbonate as the lithium compound. Further, the ratio of the content ratio of the oxoacid compound to the content ratio of the precursor oxide in the obtained solid composition, that is, the value of XO/XP when the content ratio of the precursor oxide in the solid composition was represented by XP [mass %] and the content ratio of the oxoacid compound in the solid composition was represented by XO [mass %] was 0.0480.

Subsequently, 100 parts by mass of the thus obtained solid composition and 100 parts by mass of $LiCoO_2$ particles that are a lithium composite oxide having a layered crystal structure as a positive electrode active material were mixed using an agate mortar, whereby a mixed powder was obtained.

1 g of a mixture as the thus obtained mixed powder was taken out and filled in a pellet die with an exhaust port having an inner diameter of 10 mm manufactured by Specac, Inc., followed by press molding under a load of 0.1 kN, whereby a pellet as a molded material was formed. At one face of the obtained pellet in a circular disk shape, 1 g of the solid composition was further stacked, followed by press molding under a load of 6 kN, whereby a press-molded body was obtained.

The obtained press-molded body was placed in a crucible made of alumina, and fired in an air atmosphere at 900° C. for 8 hours, whereby a positive electrode active material composite body as a fired body was obtained.

Examples 2 to 10

Positive electrode active material composite bodies were produced in the same manner as in the above-mentioned Example 1 except that the heating time of the second heat treatment to be performed for the mixture in a gel form was changed as shown in Table 1.

Example 11

A mixed liquid prepared in the same manner as in the above-mentioned Example 1 and $LiCoO_2$ particles that are a lithium composite oxide having a layered crystal structure as a positive electrode active material were mixed. The thus obtained mixture in a liquid form was sprayed and dried at a treatment temperature of 200° C. using a spray dryer (ADL311S-A manufactured by Yamato Scientific Co., Ltd.) so as to remove the liquid component contained in the mixture in a liquid form, whereby an assembly of composite particles in which a coating film in a gel form was formed at a surface of the positive electrode active material was obtained.

For the thus obtained assembly of the composite particles, a treatment in which the assembly is mixed with the mixed liquid prepared in the same manner as in the above-mentioned Example 1, and the resulting mixture is sprayed and dried using the spray dryer in the same manner as described above repeatedly for a predetermined number of times, whereby an assembly of composite particles in which a coating film with a desired thickness was formed at a surface of the positive electrode active material was obtained. In the production of the assembly of the composite particles, 400 parts by mass of the mixed liquid prepared in the same manner as in the above-mentioned Example 1 and 1 part by mass of $LiCoO_2$ particles that are a lithium composite oxide having a layered crystal structure as a positive electrode active material were used.

Subsequently, by performing a heat treatment in the air at 540° C. for 30 minutes for the thus obtained assembly of the composite particles, a particle-containing composition containing a plurality of positive electrode active material composite particles each including a base particle constituted by the positive electrode active material, and a coating layer that is constituted by a solid composition containing a multiple oxide constituted by a crystal phase different from the crystal phase of the ion conductor at normal temperature and normal pressure, a lithium compound, and an oxoacid compound, and that at least partially coats the surface of the base particle was obtained.

The thus obtained solid composition constituting the coating layer of the positive electrode active material composite particles contained the precursor oxide constituted by a pyrochlore-type crystal phase and lithium carbonate as the lithium compound. Further, the ratio of the content ratio of the oxoacid compound to the content ratio of the precursor oxide in the obtained solid composition, that is, the value of XO/XP when the content ratio of the precursor oxide in the solid composition was represented by XP [mass %] and the content ratio of the oxoacid compound in the solid composition was represented by XO [mass %] was 0.0480.

1 g of the thus obtained particle-containing composition was taken out and filled in a pellet die with an exhaust port having an inner diameter of 10 mm manufactured by Specac, Inc., followed by press molding under a load of 0.1 kN, thereby forming a pellet as a molded material. Then, at one face of the obtained pellet in a circular disk shape, further 1 g of the solid composition obtained in the above-mentioned Example 1 was stacked, followed by press molding under a load of 6 kN, whereby a press-molded body was obtained.

The obtained press-molded body was placed in a crucible made of alumina, and fired in an air atmosphere at 900° C. for 8 hours, whereby a positive electrode active material composite body as a fired body was obtained.

The solid compositions obtained by the production process for a positive electrode active material composite body of the respective Examples all contained the precursor oxide constituted by a pyrochlore-type crystal phase and lithium carbonate as the lithium compound. Further, the ratio of the content ratio of the oxoacid compound to the content ratio of the precursor oxide in the obtained solid composition, that is, the value of XO/XP when the content ratio of the precursor oxide in the solid composition was represented by XP [mass %] and the content ratio of the oxoacid compound in the solid composition was represented by XO [mass %] was a value within a range of 0.013 or more and 0.58 or less. Further, in all the solid compositions obtained by the production process for a positive electrode active material composite body of the respective Examples, the value of XO/XL when the content ratio of the lithium compound in the solid composition was represented by XL [mass %] and the content ratio of the oxoacid compound in the solid composition was represented by XC [mass %] was a value within a range of 0.05 or more and 2 or less. Further, in all the solid compositions obtained by the production process for a positive electrode active material composite body of the respective Examples, the value of XL/XP when the content ratio of the precursor oxide in the solid composition was represented by XP [mass %] and the content ratio of the lithium compound in the solid composition was represented by XL [mass %] was a value within a range of 0.13 or more and 0.58 or less.

Further, in all the positive electrode active material composite bodies obtained in the respective Examples, the content ratio of the liquid component was 0.1 mass % or less, and the content ratio of the oxoacid compound was 10 ppm or less. Further, in all the positive electrode active material composite bodies obtained in the respective Examples, the solid electrolyte that is an ion conductor generated from the constituent material of the solid composition had a cubic garnet-type crystal phase.

Comparative Example 1

A positive electrode active material composite body was produced in the same manner as in the above-mentioned Example 1 except that a material prepared as follows was used as the mixed liquid.

The preparation of the mixed liquid was performed as follows.

That is, first, a first solution containing lanthanum nitrate hexahydrate as a lanthanum source, zirconium tetrabutoxide as a zirconium source, niobium pentaethoxide as a niobium source, and 2-n-butoxyethanol as a solvent at a predetermined ratio was prepared, and a second solution containing lithium nitrate as a lithium compound and 2-n-butoxyethanol as a solvent at a predetermined ratio was prepared.

Subsequently, the first solution and the second solution were mixed at a predetermined ratio, whereby a mixed liquid in which the content ratio of Li, La, Zr, and Nb is 6.3:3:1.3:0.7 in molar ratio was obtained.

Comparative Example 2

First, lanthanum oxide as a lanthanum source, zirconium oxide as a zirconium source, niobium oxide as a niobium source, and lithium oxide as a lithium compound were weighed so that the content ratio of Li, La, Zr, and Nb is 6.3:3:1.3:0.7 in molar ratio, and these compounds were sufficiently mixed while grinding using an agate mortar, whereby a mixed powder was obtained.

2 g of a mixture as the thus obtained mixed powder was taken out and filled in a pellet die with an exhaust port having an inner diameter of 10 mm manufactured by Specac, Inc., followed by press molding under a load of 5 kN, whereby a press-molded body in a pellet form was obtained.

The obtained press-molded body was placed in a crucible made of alumina, and fired in an air atmosphere at 1200° C. for 18 hours, whereby a solid electrolyte fired body as a fired body was obtained.

The thus obtained solid electrolyte fired body that is an ion conductor was ground using an agate mortar, whereby a solid electrolyte powder was obtained.

Subsequently, 100 parts by mass of the thus obtained solid electrolyte powder that is a powder of the ion conductor and 100 parts by mass of $LiCoO_2$ particles that are a lithium composite oxide having a layered crystal structure as a positive electrode active material were mixed using an agate mortar, whereby a mixed powder was obtained.

1 g of a mixture as the thus obtained mixed powder was taken out and filled in a pellet die with an exhaust port having an inner diameter of 10 mm manufactured by Specac, Inc., followed by press molding under a load of 0.1 kN, thereby forming a pellet as a molded material. Then, at one face of the obtained pellet in a circular disk shape, further 1 g of the solid composition obtained in the above-mentioned Example 1 was stacked, followed by press molding under a load of 6 kN, whereby a press-molded body was obtained.

The obtained press-molded body was placed in a crucible made of alumina, and fired in an air atmosphere at 900° C. for 8 hours, whereby a positive electrode active material composite body as a fired body was obtained.

A sample of the positive electrode active material composite body according to each of the respective Examples was processed into a flake shape using an FIB section processing device Helios 600 manufactured by FEI, Inc., and an element distribution and a composition were examined by various analytical methods. Based on the results of transmission electron microscopic observation and selected area electron diffraction using JEM-ARM 200F manufactured by JEOL Ltd., it was confirmed that the ion conductor constituting the positive electrode active material composite body is constituted by an amorphous region with a relatively large size of about several hundred nanometers or more, and a region of an assembly composed of nanocrystals with a size of 30 nm or less. Further, based on energy dispersive X-ray spectroscopy using a detector JED-2300T manufactured by JEOL Ltd. and energy loss spectroscopy, from the amorphous region of the ion conductor constituting the positive electrode active material composite body according to each of the respective Examples, lithium, carbon, and oxygen were detected, and from the region of the assembly composed of nanocrystals, lanthanum, zirconium, and the element M were detected.

From these measurement results, it was found that the crystal grain boundary of the ion conductor is filled with a structure in an amorphous state, and it has a structure in which the grain boundary resistance of the ion conductor hardly occurs.

Further, by measurement using EDX attached to a field emission scanning electron microscope (ULTRA-55, manufactured by Carl Zeiss AG), the content ratio of Co that is a transition metal element contained in the positive electrode active material to be determined by a characteristic X-ray was determined. From the result, an average decrease ratio of the content ratio of Co until a point where the content ratio of Co that is a transition metal element contained in the positive electrode active material in the ion conductor to be determined by the characteristic X-ray has reached 12% of the content ratio of Co at an interface between the positive electrode active material and the ion conductor based on a substance amount was determined.

The conditions for the positive electrode active material composite bodies of the respective Examples and the respective Comparative Examples are collectively shown in Table "Method B", and the average decrease ratio of the content ratio of Co until a point where the content ratio of Co that is a transition metal element contained in the positive electrode active material in the ion conductor to be determined by the characteristic X-ray has reached 12% of the content ratio of Co at an interface between the positive electrode active material and the ion conductor based on a substance amount is denoted as "Average decrease ratio of Co". Further, with respect to the solid compositions obtained by the production process for a positive electrode active material composite body of the respective Examples, when measurement was performed by TG-DTA at a temperature raising rate of 10° C./min, only one exothermic peak was observed in a range of 300° C. or higher and 1,000° C. or lower in all the compositions. From the results, it can be said that the solid compositions obtained by the production process for a positive electrode active material composite body of the respective Examples are constituted by a substantially single crystal phase. Further, in all the respective Examples, the crystal grain diameter of the precursor oxide contained in the solid composition obtained by the production process for a positive electrode active material composite body was 20 nm or more and 160 nm or less. Further, in the respective Examples, in all the solid compositions obtained by the production process for a positive electrode active material composite body, the content ratio of the precursor oxide was 55 mass % or more and 60 mass % or less, the content ratio of the lithium compound was 15 mass % or more and 17 mass % or less, and the content ratio of the oxoacid compound was 2.0 mass % or more and 10 mass % or less. Further, in the respective Examples and the respective Comparative Examples, the positive electrode active materials all had a layered crystal structure. Further, the content ratio of components other than the positive electrode active material and the ion conductor in each of the positive electrode active material composite bodies of the respective Examples was 5 mass % or less.

TABLE 1

| | | Heat treatment | Positive electrode active material | | | Ion conductor | | Void | Average decrease |
|---|---|---|---|---|---|---|---|---|---|
| | Production method | time at 540° C. [min] | Composition | Average particle diameter [μm] | Proportion [vol %] | Composition | Proportion [vol %] | Proportion [vol %] | ratio of Co [%] |
| Example 1 | Method A | 35 | $LiCoO_2$ | 5.5 | 50 | $Li_{6.3}La_3Zr_{1.3}Sb_{0.5}Ta_{0.2}O_{12}$ | 45 | 5 | 0.63 |
| Example 2 | Method A | 30 | $LiCoO_2$ | 5.5 | 50 | $Li_{6.3}La_3Zr_{1.3}Sb_{0.5}Ta_{0.2}O_{12}$ | 45 | 5 | 0.88 |
| Example 3 | Method A | 25 | $LiCoO_2$ | 5.5 | 50 | $Li_{6.3}La_3Zr_{1.3}Sb_{0.5}Ta_{0.2}O_{12}$ | 45 | 5 | 2.2 |
| Example 4 | Method A | 20 | $LiCoO_2$ | 5.5 | 50 | $Li_{6.3}La_3Zr_{1.3}Sb_{0.5}Ta_{0.2}O_{12}$ | 45 | 5 | 3.17 |
| Example 5 | Method A | 15 | $LiCoO_2$ | 5.5 | 50 | $Li_{6.3}La_3Zr_{1.3}Sb_{0.5}Ta_{0.2}O_{12}$ | 45 | 5 | 5.28 |
| Example 6 | Method A | 10 | $LiCoO_2$ | 5.5 | 50 | $Li_{6.3}La_3Zr_{1.3}Sb_{0.5}Ta_{0.2}O_{12}$ | 45 | 5 | 6.1 |
| Example 7 | Method A | 5 | $LiCoO_2$ | 5.5 | 50 | $Li_{6.3}La_3Zr_{1.3}Sb_{0.5}Ta_{0.2}O_{12}$ | 45 | 5 | 6.2 |
| Example 8 | Method A | 40 | $LiCoO_2$ | 5.5 | 50 | $Li_{6.3}La_3Zr_{1.3}Sb_{0.5}Ta_{0.2}O_{12}$ | 45 | 5 | 0.5 |
| Example 9 | Method A | 45 | $LiCoO_2$ | 5.5 | 50 | $Li_{6.3}La_3Zr_{1.3}Sb_{0.5}Ta_{0.2}O_{12}$ | 45 | 5 | 0.49 |
| Example 10 | Method A | 60 | $LiCoO_2$ | 5.5 | 50 | $Li_{6.3}La_3Zr_{1.3}Sb_{0.5}Ta_{0.2}O_{12}$ | 45 | 5 | 0.11 |
| Example 11 | Method B | 30 | $LiCoO_2$ | 5.5 | 50 | $Li_{6.3}La_3Zr_{1.3}Sb_{0.5}Ta_{0.2}O_{12}$ | 45 | 5 | 0.87 |
| Comparative Example 1 | Method A | 30 | $LiCoO_2$ | 5.5 | 50 | $Li_{6.3}La_3Zr_{1.3}Nb_{0.7}O_{12}$ | 45 | 5 | 0.54 |
| Comparative Example 2 | — | 30 | $LiCoO_2$ | 5.5 | 43 | $Li_{6.3}La_3Zr_{1.3}Nb_{0.7}O_{12}$ | 32 | 25 | 7.8 |

1. Note that in Table 1, in the column for the production method, a method corresponding to the production method for a positive electrode active material composite body of the first embodiment described above is denoted as "Method A" and a method corresponding to the production method for a positive electrode active material composite body of the second embodiment described above is denoted as

[6] Evaluation

With respect to the respective Examples and the respective Comparative Examples, the following evaluation was performed.

[6-1] Evaluation of Internal Resistance

With respect to each of the positive electrode active material composite bodies of the respective Examples and the respective Comparative Examples, a lithium metal foil having a diameter of 8 mm (manufactured by Honjo Chemical Corporation) was bonded to both faces, whereby activated electrodes were formed. Then, an AC impedance was measured using an AC impedance analyzer Solartron 1260 (manufactured by Solartron Analytical, Inc.), and the lithium ion conductivity was determined. The measurement was performed at an AC amplitude of 10 mV in a frequency range from $10^7$ Hz to $10^{-1}$ Hz. The lithium ion conductivity obtained by the measurement shows the total lithium ion conductivity including the bulk lithium ion conductivity and the grain boundary lithium ion conductivity in each fired body. It can be said that as this value is larger, the ion conductance is higher and the internal resistance is smaller.

[6-2] Evaluation of Charge-Discharge Characteristics

Lithium metal manufactured by Honjo Chemical Corporation was punched into a circular shape with a diameter of 4 mm and bonded to both faces of each of the positive electrode active material composite bodies of the respective Examples and the respective Comparative Examples, whereby all solid-state batteries for evaluation were formed.

Each of these all solid-state batteries for evaluation was coupled to a battery charge-discharge evaluation system HJ1001SD8 manufactured by Hokuto Denko Corporation, and a relationship between the charge-discharge rate and the battery capacity at 25° C. was analyzed, and then, the discharge capacity at 0.1C was determined. It can be said that as the value of the discharge capacity at 0.1C was larger, the charge-discharge characteristics are more excellent.

These results are collectively shown in Table 2.

TABLE 2

|  | Internal resistance Ion conductivity [S/cm] | Charge-discharge characteristics Discharge capacity at 0.1 C [mAh/g] |
|---|---|---|
| Example 1 | $7.4 \times 10^{-4}$ | 129 |
| Example 2 | $7.6 \times 10^{-4}$ | 135 |
| Example 3 | $7.2 \times 10^{-4}$ | 122 |
| Example 4 | $6.1 \times 10^{-4}$ | 112 |
| Example 5 | $5.5 \times 10^{-4}$ | 106 |
| Example 6 | $5.6 \times 10^{-4}$ | 101 |
| Example 7 | $4.7 \times 10^{-4}$ | 93 |
| Example 8 | $5.9 \times 10^{-4}$ | 103 |
| Example 9 | $5.8 \times 10^{-4}$ | 96 |
| Example 10 | $4.2 \times 10^{-4}$ | 88 |
| Example 11 | $7.6 \times 10^{-4}$ | 132 |
| Comparative Example 1 | $5.2 \times 10^{-4}$ | 109 |
| Comparative Example 2 | $2.4 \times 10^{-6}$ | 11 |

As apparent from Table 2, excellent results were obtained according to the present disclosure. On the other hand, satisfactory results could not be obtained in Comparative Examples.

Figure 15:
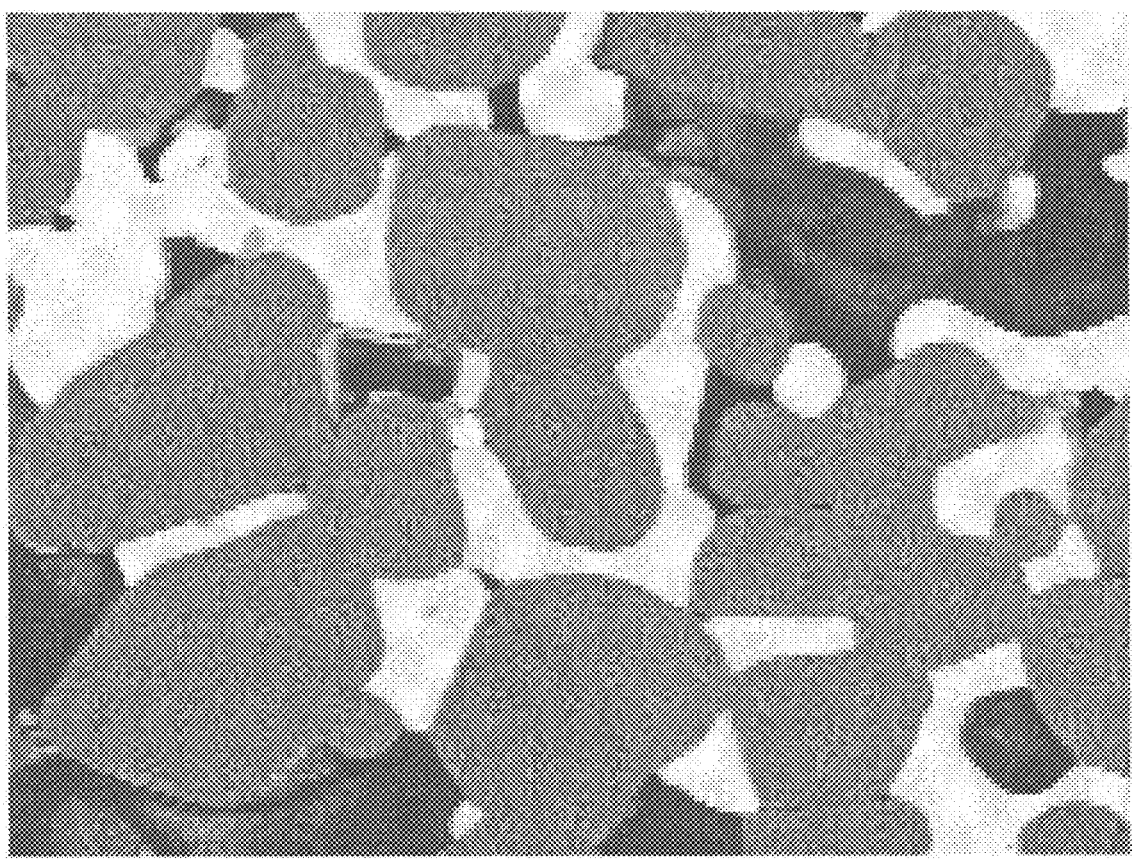
FIG. 15 is a view showing an observation image obtained by a field emission scanning electron microscope for a positive electrode active material composite body of Example 1.
Figure 16:
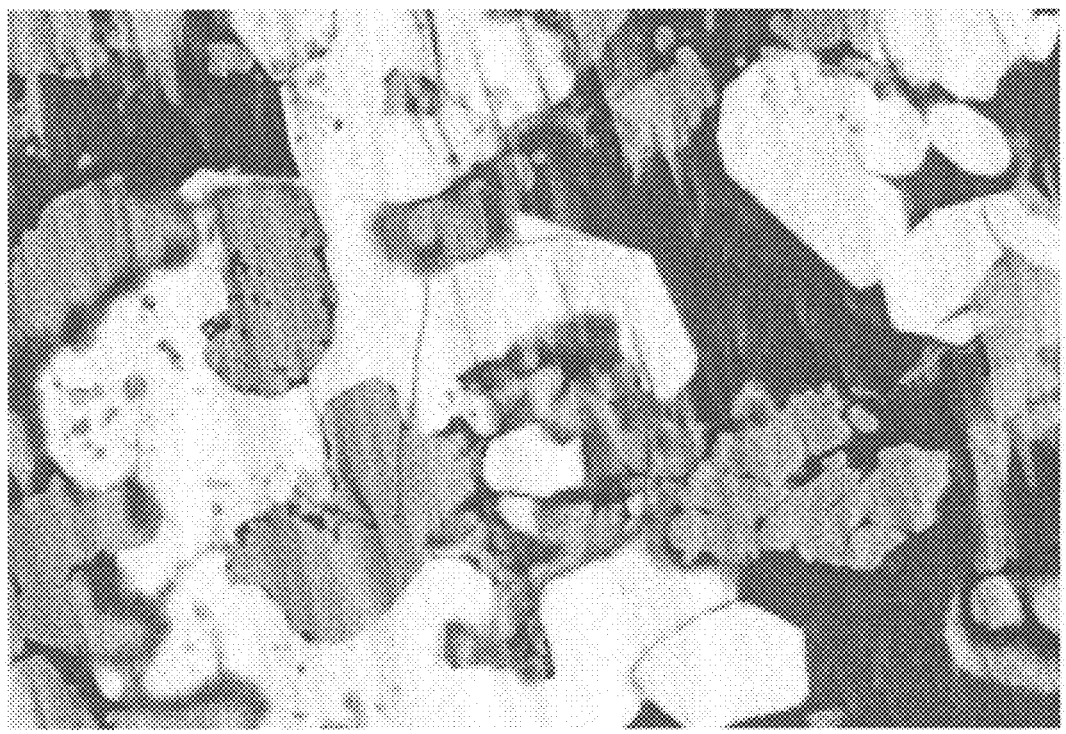
FIG. 16 is a view showing an observation image obtained by a field emission scanning electron microscope for a positive electrode active material composite body of Example 11.
Figure 17:
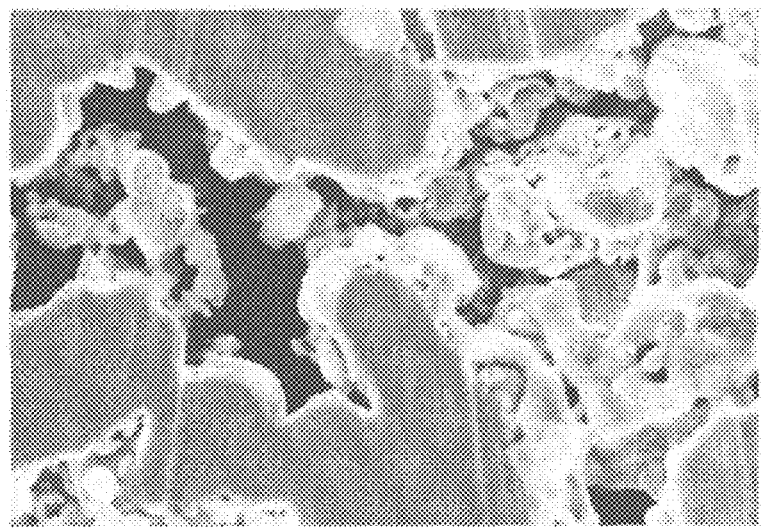
FIG. 17 is a view showing an observation image obtained by a field emission scanning electron microscope for a positive electrode active material composite body of Comparative Example 1.
Figure 18:
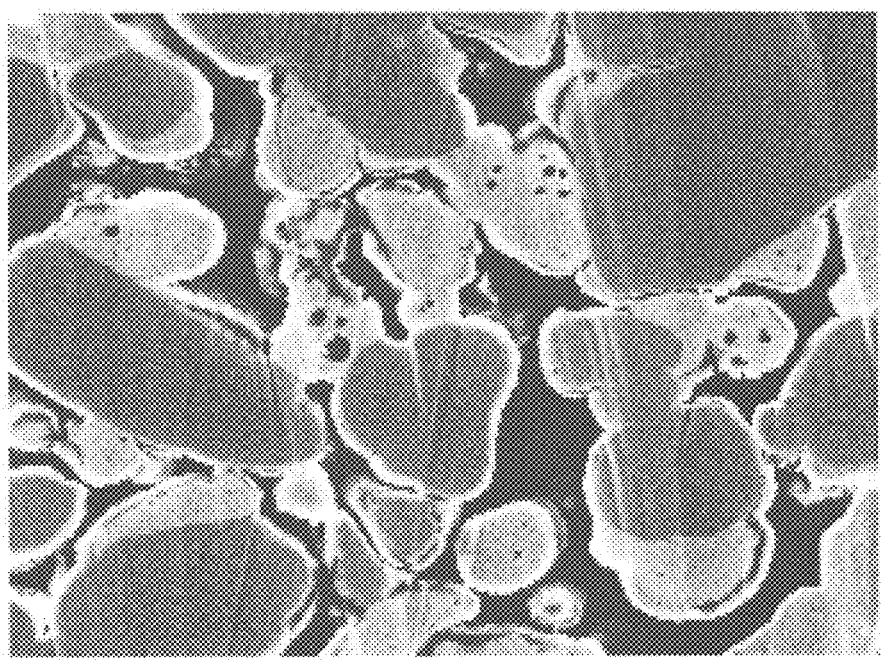
FIG. 18 is a view showing an observation image obtained by a field emission scanning electron microscope for a positive electrode active material composite body of Comparative Example 2.

Further, from observation images obtained using a field emission scanning electron microscope (XL30, manufactured by Philips Electron Optics), it was confirmed that in all the respective Examples, the positive electrode active material and the ion conductor are adhered to each other at a high adhesion degree. Observation images obtained using the field emission scanning electron microscope for the positive electrode active material composite bodies of the above-mentioned Examples 1 and 11 are shown in FIGS. 15 and 16, respectively, and observation images obtained using the field emission scanning electron microscope for the positive electrode active material composite bodies of the above-mentioned Comparative Examples 1 and 2 are shown in FIGS. 17 and 18, respectively. In these observation images, a portion that looks white is the ion conductor, a portion that looks gray is the positive electrode active material, and a portion that looks black is a void portion.

What is claimed is:

1. A positive electrode active material composite body, comprising:
    a positive electrode active material containing a transition metal element and having a particulate shape; and
    an ion conductor provided in contact with a surface of the positive electrode active material, wherein
    the ion conductor is constituted by a material containing Li, Zr, and M which is at least one type of element selected from the group consisting of Nb, Sb, and Ta,
    the transition metal element is partially diffused in the ion conductor,
    an average decrease ratio of a content ratio of the transition metal element until a point where the content ratio of the transition metal element in the ion conductor to be determined by a characteristic X-ray has reached 12% of the content ratio of the transition metal element at an interface between the positive electrode active material and the ion conductor based on a substance amount is 0.5% or more and 6.1% or less per 1 nm thickness from the interface, and
    wherein the ion conductor is a garnet-type or garnet-like crystal that is represented by a compositional formula: $Li_{7-x}La_3(Zr_{2-x}M_x)O_{12}$, and that satisfies $0.7 \leq x \leq 1.3$.

2. The positive electrode active material composite body according to claim 1, wherein the transition metal element contained in the positive electrode active material is Co.

3. The positive electrode active material composite body according to claim 2, wherein the positive electrode active material is $LiCoO_2$.

* * * * *